(12) United States Patent
McLaughlin et al.

(10) Patent No.: US 11,681,034 B2
(45) Date of Patent: Jun. 20, 2023

(54) RANGING WITH SIMULTANEOUS FRAMES

(71) Applicant: DecaWave, Ltd., Dublin (IE)

(72) Inventors: Michael McLaughlin, Dublin (IE); Jaroslaw Niewczas, Jozefow (PL)

(73) Assignee: DECAWAVE, LTD., Dublin (IE)

( * ) Notice: Subject to any disclaimer, the term of this patent is extended or adjusted under 35 U.S.C. 154(b) by 216 days.

(21) Appl. No.: 16/761,160

(22) PCT Filed: Dec. 7, 2018

(86) PCT No.: PCT/EP2018/084058
§ 371 (c)(1),
(2) Date: May 1, 2020

(87) PCT Pub. No.: WO2019/110833
PCT Pub. Date: Jun. 13, 2019

(65) Prior Publication Data
US 2020/0348409 A1    Nov. 5, 2020

(30) Foreign Application Priority Data

Dec. 8, 2017 (GB) .................................. 1720550
Mar. 23, 2018 (GB) .................................. 1804735
Jul. 9, 2018 (GB) .................................. 1811245

(51) Int. Cl.
*G01S 13/76*    (2006.01)
*H04B 1/7163*    (2011.01)
(Continued)

(52) U.S. Cl.
CPC .......... *G01S 13/765* (2013.01); *H04B 1/7163* (2013.01); *H04W 12/037* (2021.01);
(Continued)

(58) Field of Classification Search
USPC .......................................................... 342/125
See application file for complete search history.

(56) References Cited

U.S. PATENT DOCUMENTS 9,807,570 B1    10/2017    Lazarini et al.
2012/0219093 A1    8/2012    Jia et al.
(Continued)

FOREIGN PATENT DOCUMENTS

CN    103648417 A    3/2014
CN    106572037 A    4/2017
(Continued)

OTHER PUBLICATIONS

International Search Report and Written Opinion for International Patent Application No. PCT/EP2018/084058, dated Mar. 14, 2019, 14 pages.
(Continued)

*Primary Examiner* — Tyler D Paige
(74) *Attorney, Agent, or Firm* — Withrow & Terranova, P.L.L.C.

(57) ABSTRACT

A method of transmitting signals from a first node having multiple transceivers to a second node is disclosed. The method comprises receiving a message from the second node at the first node, wherein the message is received by each of a plurality of transceivers of the first node; and transmitting by each of the plurality of transceivers a respective data frame to the second node in response to the message; wherein each transceiver initiates the transmission of its respective data frame a predetermined time period after receipt of the message by the transceiver; and wherein the transmissions of the data frames from the plurality of transceivers overlap. The data frames may form part of a two-way ranging exchange.

15 Claims, 37 Drawing Sheets

(51) Int. Cl.
  H04W 12/037 (2021.01)
  B60R 25/20 (2013.01)
  B60R 25/24 (2013.01)
  G05D 1/00 (2006.01)
  B60W 30/06 (2006.01)

(52) U.S. Cl.
  CPC ........... *B60R 25/2072* (2013.01); *B60R 25/24* (2013.01); *B60R 2325/108* (2013.01); *B60W 30/06* (2013.01); *G05D 1/0022* (2013.01); *G05D 2201/0213* (2013.01); *H04B 2201/71634* (2013.01)

(56) References Cited

U.S. PATENT DOCUMENTS

| | | | |
|---|---|---|---|
| 2012/0296234 | A1 | 11/2012 | Wilhelm et al. |
| 2015/0235486 | A1 | 8/2015 | Ellis et al. |
| 2015/0302729 | A1* | 10/2015 | Pilat ................. G08C 17/02 340/5.25 |
| 2016/0353238 | A1 | 12/2016 | Gherardi et al. |
| 2016/0366548 | A1 | 12/2016 | Wang et al. |
| 2017/0192086 | A1 | 7/2017 | Hamada et al. |
| 2017/0272906 | A1* | 9/2017 | Kerai .................... H04W 12/06 |
| 2018/0254910 | A1* | 9/2018 | Dutz ................. H04W 12/0431 |

FOREIGN PATENT DOCUMENTS

| | | |
|---|---|---|
| EP | 1982876 A2 | 10/2008 |
| EP | 3370082 A1 | 9/2018 |
| JP | 2010283582 A | 12/2010 |
| JP | 2011217392 A | 10/2011 |
| JP | 2015062302 A | 4/2015 |
| WO | 2017134310 A1 | 8/2017 |

OTHER PUBLICATIONS

Golen, et al. "A Low Latency Scheme for Bulk RFID Tag Reading," 2008 IEEE Wireless Communications and Networking Conference, Mar. 31-Apr. 3, 2008, Las Vegas, NV, pp. 1565-1569.
First Office Action for Chinese Patent Application No. 201880088925.2, dated Jul. 21, 2021, 10 pages.
Examination Report for European Patent Application No. 18815197.1, dated Nov. 4, 2021, 7 pages.
Notice of Reason(s) for Refusal for Japanese Patent Application No. 2020530979, dated Aug. 30, 2022, 8 pages.
Notice of Preliminary Rejection for Korean Patent Application No. 1020207019255, dated Oct. 25, 2022, 14 pages.
Notice of Reason(s) for Refusal for Japanese Patent Application No. 2020530979, dated Mar. 7, 2023, 5 pages.
Request for Submission of an Opinion for Korean Patent Application No. 1020207019255, dated Apr. 20, 2023, 4 pages.

* cited by examiner

RANGING WITH SIMULTANEOUS FRAMES

This application is a national stage entry of and related to PCT Application Serial No. PCT/EP2018/084058, filed 7 Dec. 2018 ("PCT Application").

This application claims priority to the PCT Application, and hereby claims benefit of the filing dates thereof pursuant to 37 CFR § 1.78(a)(4).

The subject matter of the PCT Application, in its entirety, is expressly incorporated herein by reference.

The present invention relates to systems and methods for communication between devices, where at least one of the devices includes multiple transceivers. Particular examples relate to ranging exchanges between such devices.

Provision of multiple transmitters on a device (especially larger devices such as vehicles) can improve the likelihood that transmissions will be reliably received at other remote devices (e.g. a wireless key fob for the vehicle). Such transmissions may be used e.g. for ranging (distance determination) or remote control (e.g. door locking/unlocking, automatic parking functions etc.) However, the need for the remote device to listen for communications from any of the transmitters increases power requirements at the remote device, which is problematic for many small devices (e.g. key fobs) which typically have limited battery capacity and/or long battery life requirements.

Embodiments of the invention seek to ameliorate such problems and provide improved communication schemes for multi-transmitter devices.

Accordingly, in a first aspect of the invention, there is provided a method of transmitting signals from a first node having multiple transceivers to a second node, comprising: receiving a message from the second node at the first node, wherein the message is received by each of a plurality of transceivers of the first node; and transmitting by each of the plurality of transceivers a respective data frame to the second node in response to the message; wherein each transceiver initiates the transmission of its respective data frame a predetermined time period after receipt of the message by the transceiver; and wherein the transmissions of the data frames from the plurality of transceivers overlap.

The predetermined time period may be the same for each of the transmitted data frames.

Alternatively, the predetermined time period may be different for each of the transmitted data frames. Preferably, the predetermined time periods for the data frames differ from each other by less than the transmission duration of each of the data frames. Preferably, each of the predetermined time periods is shorter than the data frame transmission duration.

Preferably, each data frame comprises a training sequence, the data frames arranged such that the training sequences are transmitted by each transceiver a common time delay after receipt of the message by the transceiver (i.e. the time delay until the start of the training sequence may be the same for each data frame). This training sequence may be a second training sequence of the data frames, appearing later in the frame than another, first training sequence.

Preferably, each of the data frames comprises a first training sequence and a second training sequence. Preferably, for each respective data frame, the first training sequence is arranged to start a first time period after reception of the message by the respective transceiver, wherein the first time period optionally differs from the first time period of each of the other data frames. The second training sequence may be arranged, for each respective data frame, to start a second time period after reception of the message by the respective transceiver, wherein the second time period is optionally the same for each of the data frames. Alternatively, both the first and second time periods may be the same for each data frame; in such an embodiment the frames may be fully aligned (each frame section starting the same duration after a reception of the message in each version of the data frame). In such an example, the frames would be transmitted fully in parallel (aligned) except possibly for small relative offsets due to different propagation times between the second node and each of the transceivers.

In a further aspect of the invention, there is provided a method of transmitting signals from a first node comprising a plurality of transceivers to a second node, the method comprising: transmitting a respective data frame from each of the plurality of transceivers of the first node to the second node, wherein the transmission of each data frame is initiated relative to a transmission start time such that transmission of the data frames overlaps; wherein each of the data frames comprises a first training sequence and a second training sequence; and wherein for each respective data frame: the first training sequence is arranged to start at a different time relative to the transmission start time, compared to the corresponding first training sequences of the other data frames; and the second training sequence is arranged to start at the same time relative to the transmission start time, compared to the corresponding second training sequences of the other data frames.

The method may comprise receiving a message from the second node, wherein the data frames are sent in response to the message. The transmission start time for a respective data frame may be determined as a predetermined delay period after reception of the message by a respective transceiver.

The following optional features may be applied to either of the above aspects.

Preferably, the first training sequence is located at the start of each respective data frame, optionally preceded by a variable delay period which determines a start time of the first training sequence relative to reception of the message.

The first training sequence preferably comprises a plurality of symbols at a symbol rate, and wherein the start of each respective first training sequence is selected such that a start time of a given training sequence does not coincide with a symbol boundary of any of the other frames' first training sequences and/or such that symbol boundaries of the respective first training sequences are not aligned. Delay periods preceding respective first training sequences may be non-integer multiples of the symbol period of the first and/or second training sequence.

Preferably, the first training sequence comprises a predetermined code sequence (optionally based on a periodically repeating code). The first training sequence may be a sequence having perfect periodic autocorrelation, preferably an Ipatov sequence. The second training sequence preferably comprises a cryptographically generated training sequence.

The method may comprise varying lengths of one or more portions of the data frames preceding the second training sequences so that the second training sequences start at a common time offset after reception of the message by a respective transceiver. The method may comprise varying between different ones of the data frames the lengths of one or more of: the first training sequence, a data payload of the frame, and a transmission gap inserted prior to the second training sequence. The length(s) of one or more portions of a respective data frame are preferably varied to compensate for (preferably to balance substantially accurately) a transmission delay inserted prior to the start of the respective data frame. Preferably this is done such that the total length of the data frame up to (but not including) the second training sequence, including any delay inserted preceding the first training sequence, is the same for all data frames.

In one approach, each respective second training sequence may be preceded by a respective transmission gap sized so that the second training sequences of each of the data frames occur at the same time offset relative to reception of the message at a respective transceiver. The sum of the transmission gap inserted before the second training sequence and any delay period inserted prior to the first training sequence is preferably substantially constant for all of the data frames. The method may comprise signaling the transmission gap size in a portion of the frame preceding the second training sequence, preferably in one or both of: a physical layer header, and a payload of the frame. The method may include, for a given one of the data frames, including information specifying the respective transmission gap in unencrypted form in the physical layer header and again in encrypted form in the payload.

In one approach, each respective second training sequence may be preceded by a respective transmission gap sized so that the second training sequences of each of the data frames occur at a different time offset relative to reception of the message at a respective transceiver.

The second training sequence may be located at the end of the respective data frame and/or after a payload of the data frame. Each data frame may comprise a respective different second training sequence, or alternatively the second training sequence may be the same for each data frame (i.e. the same bit sequence).

Optionally, each data frame may further comprise a third training sequence, preferably a cryptographically generated training sequence. The third training sequence is preferably the same for each data frame. The third training sequence is preferably different from the second training sequence (i.e. a different bit sequence).

In one approach, the respective second training sequences may be arranged to start at a common start time after start of transmission of the respective data frames (or put another way after reception of the message by each respective transceiver), and the respective third training sequences may be arranged to start at respective different start times after start of transmission of the respective data frames (or after reception of the message by each respective transceiver), optionally by being preceded by a variable transmission gap.

Each data frame may comprise a respective payload, and in alternative frame structures the payload may be located before the second and third training sequences, between the second and third training sequences, or after the second and third training sequences.

In an embodiment, each data frame comprises a first aligned Ipatov training sequence, a second aligned cryptographic training sequence, and a third non-aligned cryptographic training sequence. Note that, where fields, training sequences etc. are described as time-aligned herein, this may generally mean that they are timed to be transmitted a common time offset from start of frame transmission or similarly from reception of the original message at each transceiver, resulting in the fields being transmitted at substantially the same time, though different propagation delays to different transceivers may mean that the alignment is in practice approximate rather than exact.

The method may comprise muting transmission of a portion of one or more of the data frames. The muted portion may comprise one or more of: the first training sequence, a start-of-frame delimiter, a physical layer header, and a data payload. The muting may be performed for one or more but not all of the data frames, such that at least one of the data frames comprises the portion in unmuted form. Preferably, the second and/or third training sequence is not included in the muted portion for any of the data frames.

The method may include selecting one or more transceivers for which the portion of the data frame is to be muted based on one or more of: a message from the second node; and transmission strengths of the transceivers or channel quality between the transceivers and the second node. One or more transceivers with relatively greater transmission strength or better channel quality may be selected for transmission of data packets with the first training sequence not muted. The selection may be made based on the aforementioned message from the second node to the transceivers in response to which the frames are being sent (since the channel can generally be expected to be very similar in both directions). Alternatively, the transceiver with the best channel may be selected based on other transmission protocols (LF, UHF, Bluetooth if available), or based on previous exchanges (preferably if they occurred very recently).

Muting transmission of a portion of a data frame may comprise reducing transmission power (e.g. relative to other portions of the frame) or disabling transmission for the portion.

The method may alternatively or additionally comprise muting transmission of the entirety of one or more of the data frames, preferably wherein only the data frames for one or more pre-selected ones of the transceivers are transmitted.

The method may comprise reducing transmit power for one or more of the data frames based on a signal strength of a signal (e.g. the message) previously received from the second node, preferably in response to detecting a signal strength of a detected first path of the signal exceeding a threshold signal strength (e.g. where the detected first path is particularly strong).

The second training sequence may be followed by additional data of the data frames, the method preferably comprising reducing transmission power or disabling transmission after transmission of the second training sequence for one or more of the data frames. The additional data may comprise the payload of the frame and/or a physical layer header of the frame.

Preferably, the transmission timing of each transceiver is based on a respective clock of the transceiver, the method comprising adjusting a clock frequency of one or more of the transceiver clocks to adjust a carrier frequency offset (CFO) of a respective transceiver. The clock frequency may be adjusted based on a detected CFO of an earlier transmission (e.g. the message) received from the second node. The method may comprise adjusting clock frequencies of the transceivers to set a common CFO for each transceiver relative to the CFO of the received transmission, optionally wherein the common CFO is less than or greater than the receive CFO by a given CFO offset (which may be computed dynamically). The common CFO may be a predetermined target CFO. The method may alternatively comprise setting a different relative CFO offset for each transceiver in relation to the CFO of the received transmission. The method may involve performing a first clock adjustment based on an initial message from the second node, and refining the clock adjustment based on a subsequent message from the second node.

The transmission start of the frame of each transceiver may additionally be adjusted to compensate for the transceiver's initial CFO, before CFO is adjusted to the common target CFO.

Each transceiver may be arranged to initiate transmissions at discrete time increments based on a period of a clock signal (which may be a result of a design limitation allowing the transceiver to initiate transmission only at those specific time increments). In that case the method may comprise adjusting a transmission start time for a transceiver relative to the discrete time increments by adjusting a clock frequency of the clock signal in advance of the transmission start time. This may involve increasing or decreasing the clock frequency, preferably for a determined duration, to adjust the start of a frame transmission to an earlier or later time relative to the discrete time increments defined by the clock prior to adjustment.

Preferably, the data frames are sent as part of a ranging exchange between the second node and the first node. The data frames may be sent in response to an initial message of the ranging exchange sent from the second node to the first node.

The method may further comprise receiving signals corresponding to the transmitted data frames at the second node. The method may then comprise identifying a particular one of the respective data frames at the second node and acquiring data of the identified frame. The method may comprise using the first training sequence to detect the data frame and starting acquisition of the data frame based on detection of the first training sequence.

In a further aspect of the invention (which may be combined with any of the above aspects), there is provided a method of communication between a first node and a second node, comprising, at the second node: sending a message to the first node; receiving signals corresponding to a plurality of overlapping data frames transmitted by respective transceivers of the first node; and identifying a particular one of the respective data frames and acquiring data of the identified data frame based on a first training sequence included in each respective data frame; wherein the respective first training sequences preferably start at respective different start times with respect to a reception time of the message at a respective transceiver, and wherein acquiring data of the identified frame preferably comprises detecting a second training sequence contained in each of the data frames, the second training sequences of the data frames starting at a common time offset from the reception time of the message at each of the respective transceivers.

The following optional features may be applied to any of the above aspects.

The method may comprise determining a reception time of the frame (at the second node) based on detection of the second training sequence. The received signal typically comprises multiple overlapping versions of the data frame corresponding to multiple signal paths from the transceivers to the second node. The method may comprise detecting an earliest appearance of the second training sequence in the signal and using the earliest appearance to determine the reception time of the frame. The determined reception time may be used to compute a distance between the first node and second node.

The method may comprise determining respective reception times of one or more (preferably each) of the first training sequences and determining respective distances to respective ones of the transceivers based on the respective reception times. The determined distances may be used to compute a position of the first node, for example by triangulation. The method may further comprise determining a shortest one of the determined distances, and comparing the shortest distance to a distance computed based on reception of the second training sequence, and processing the frame in dependence on the comparison. The method may include determining that the frame is authentic if the shortest distance matches the distance determined based on reception of the second training sequence and/or discarding the frame or a distance measurement determined therefrom if they do not match.

The method may comprise determining a position of the first node based on a plurality of distance measurements derived from reception times of one or more of the first, second and/or third training sequences.

The method may comprise disabling a receiver at the second node during a muted portion of the data frame being received and/or after reception of the second training sequence.

Communication between the nodes is preferably wireless based on a wireless communication protocol, for example based on an ultra-wideband, UWB, wireless communication system.

In an embodiment, the first node may comprise a vehicle and the second node may comprise a remote control device, such as a wireless key fob, for the vehicle. The frames may be exchanged as part of a control message exchange for controlling automated operation of the vehicle.

In a further aspect, the invention provides a device or system having means for performing any method as set above or as described in more detail below.

The invention further provides a device or system, comprising: a plurality of transceivers, wherein each transceiver is arranged to: receive a message from a remote device; and transmit a respective data frame to the remote device in response to the message; wherein each transceiver is configured to initiate the transmission of its respective data frame a predetermined time period after receipt of the message by the transceiver, such that the transmissions of the data frames from the plurality of transceivers overlap.

The invention further provides a device or system comprising: a transceiver for communicating with a remote device, the transceiver adapted to send a message to the remote device and receive signals corresponding to a plurality of overlapping data frames transmitted in response to the message by respective transceivers of the remote device; and means for identifying a particular one of the respective data frames and acquiring data of the identified data frame based on a first training sequence included in each respective data frame; wherein the respective first training sequences preferably start at respective different start times with respect to a reception time of the message at a respective transceiver, and wherein the acquiring means is preferably arranged to detect a second training sequence contained in each of the data frames, the second training sequences of the data frames starting at a common time offset from the reception time of the message at each of the respective transceivers.

The device or system as in either of the above aspects may further be arranged to perform or participate in any method as set out above or as described in more detail below.

The invention also provides a computer-readable medium comprising software code adapted, when executed by a data processing device, to perform any method as set out herein.

Any feature in one aspect of the invention may be applied to other aspects of the invention, in any appropriate combination. In particular, method aspects may be applied to apparatus or computer program aspects, and vice versa.

Furthermore, features implemented in hardware may generally be implemented in software, and vice versa. Any reference to software and hardware features herein should be construed accordingly.

Preferred features of the present invention will now be described, purely by way of example, with reference to the accompanying drawings, in which:—

FIG. 1 illustrated on-air frames of a UWB (Ultra Wide Band) two-way ranging protocol;

Figure 32:
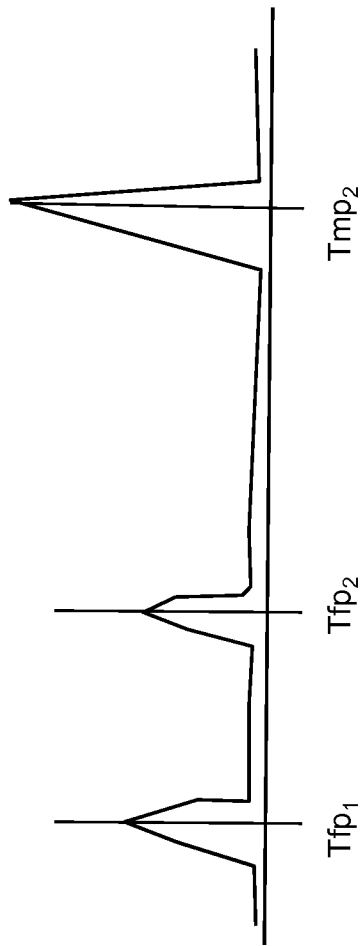
Figure 33:
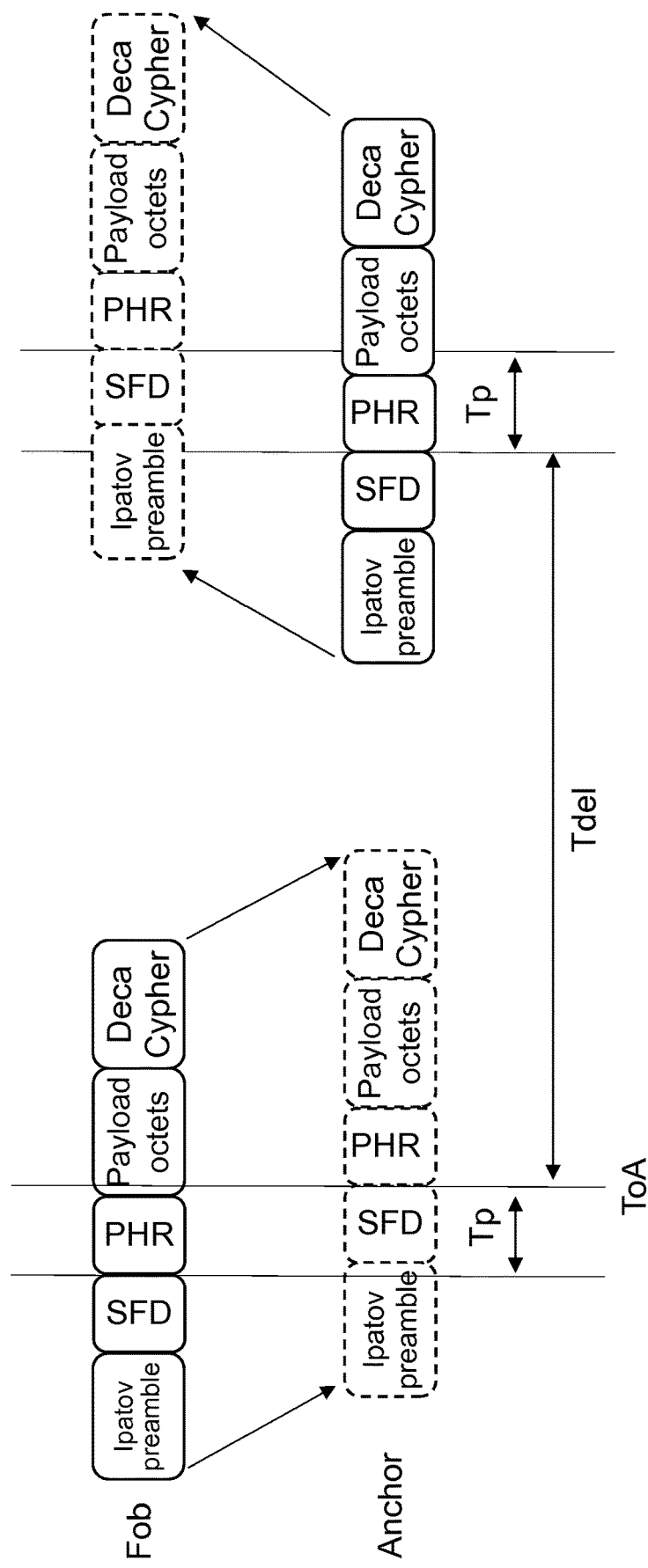
Figure 34:
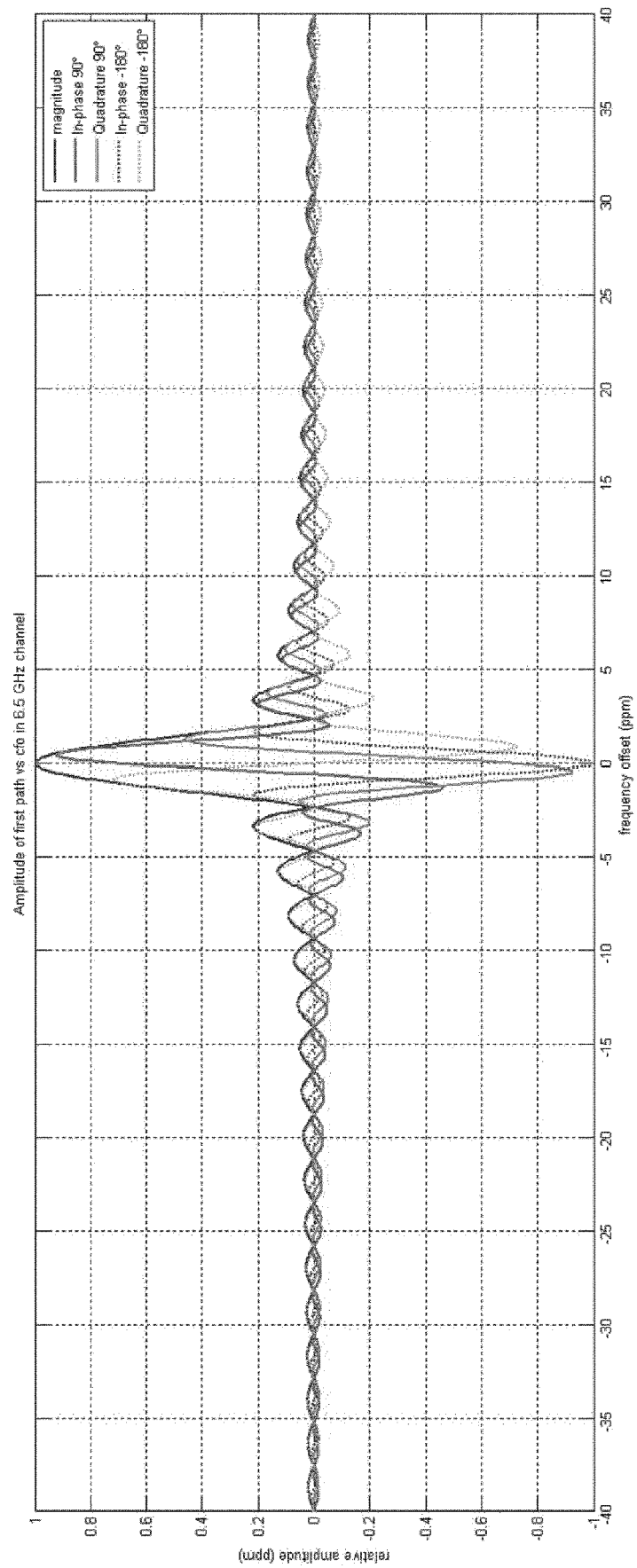
Figure 35:
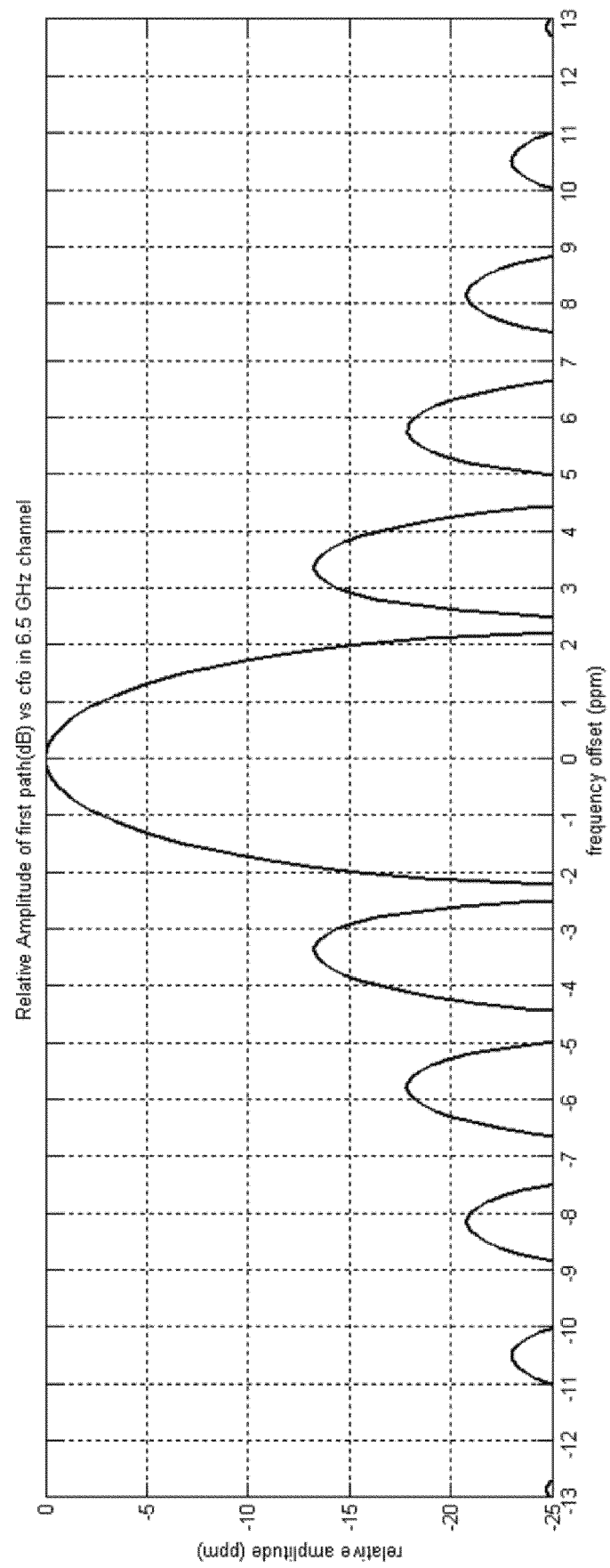
Figure 36:
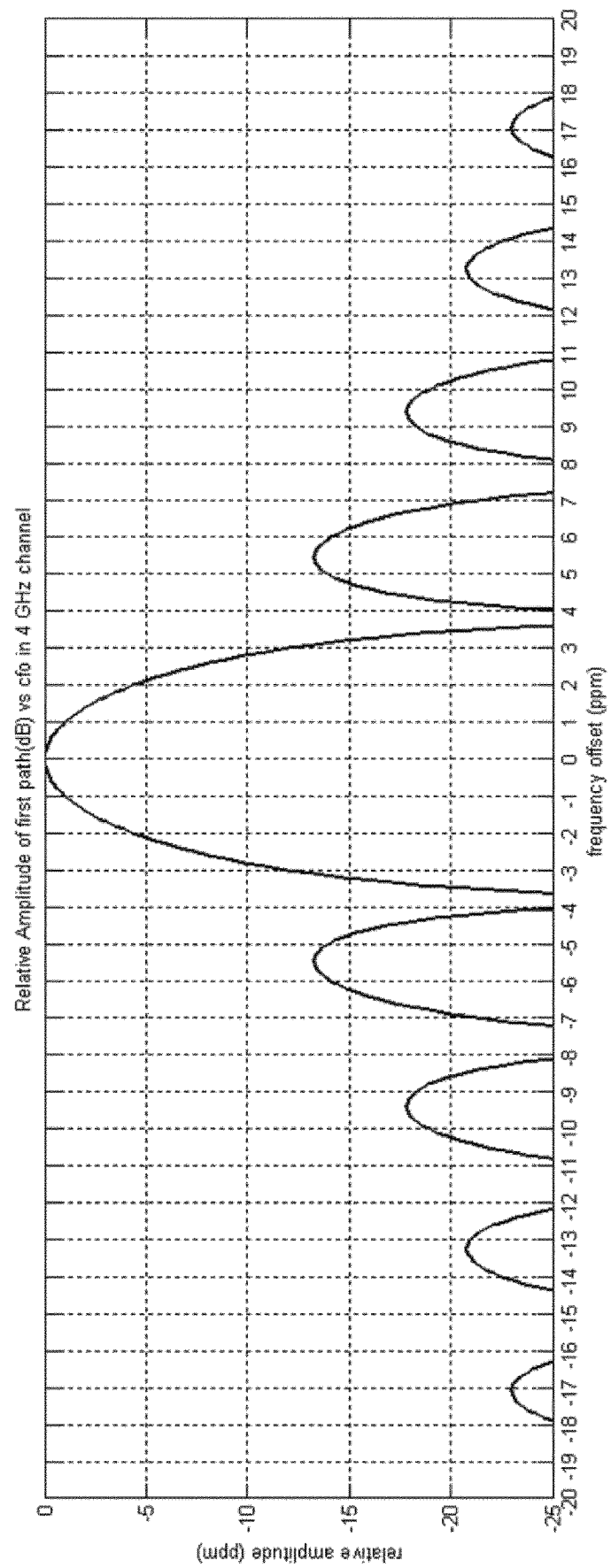
Figure 37:
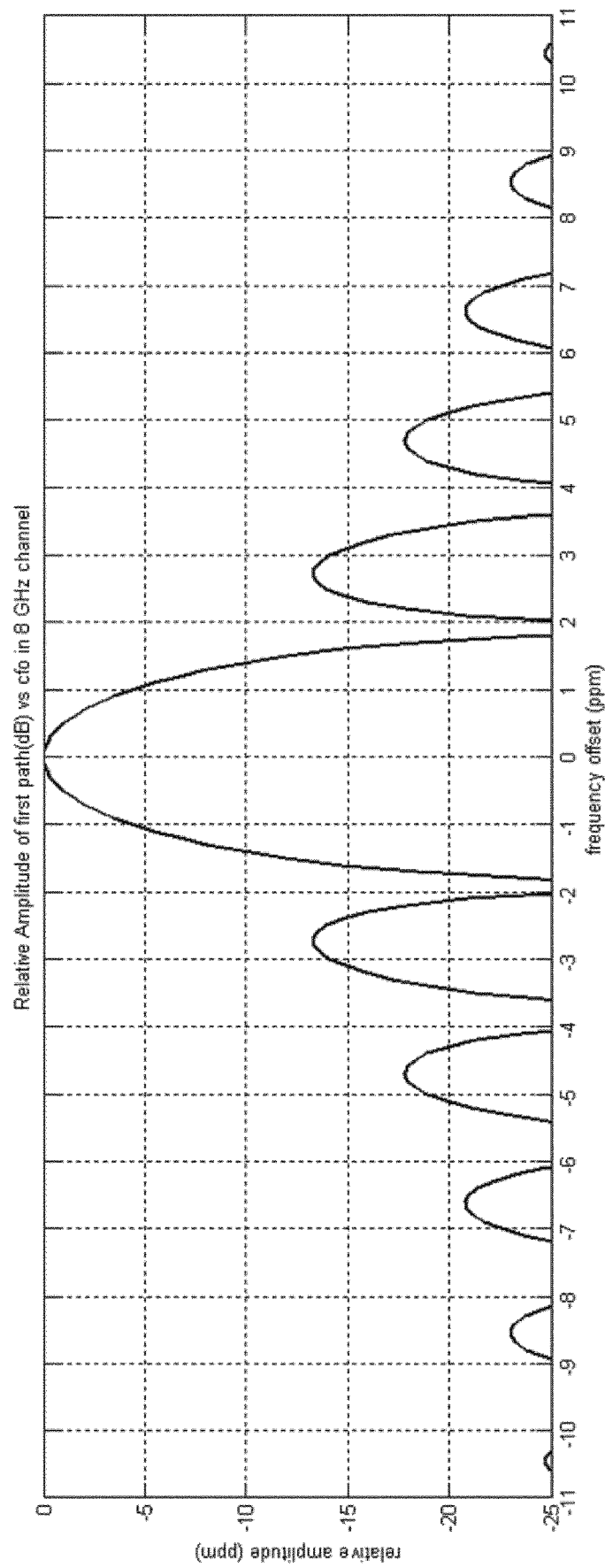

FIG. 32 illustrated estimated CIR in the example scenario;

FIG. 33 illustrates on-air frames of key fob and anchor;

FIG. 34 shows a plot of path amplitude vs CFO in a 6.5 GHz channel;

FIG. 35 shows a zoomed-in plot of path amplitude vs CFO in the same channel;

FIG. 36 shows a plot of path amplitude vs CFO in a 4 GHz channel;

FIG. 37 shows a plot of path amplitude vs CFO in an 8 GHz channel; and

FIGS. 38-41 show additional alternative frame structures.

OVERVIEW

Figure 1:
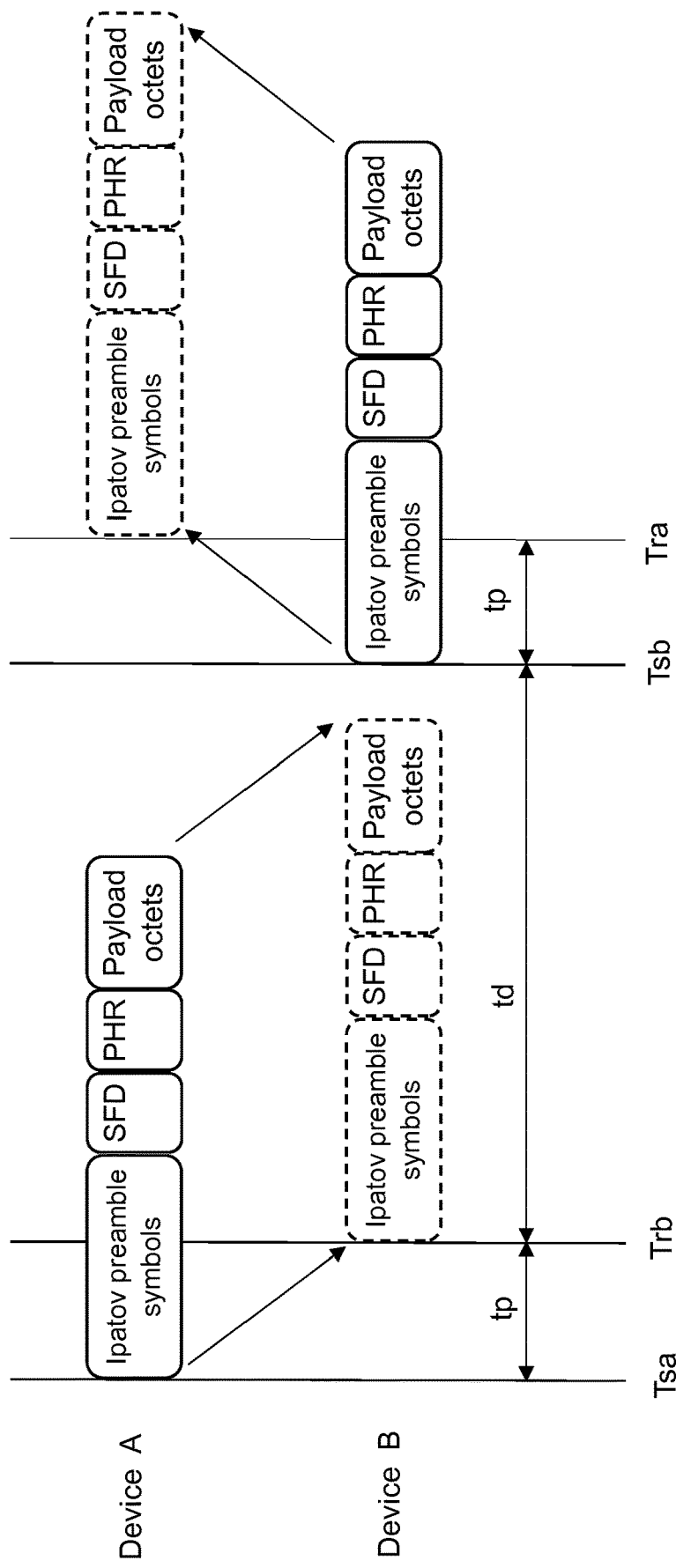

The IEEE standard 802.15.4-2011 describes an ultra-wideband physical layer (UWB PHY) with the frame structure and two way ranging ability shown in FIG. 1. The solid outlines show transmitted frames. The dotted outlines show received frames. The following abbreviations are used in FIG. 1 and subsequent diagrams to denote certain portions of the frames:

SFD—Start Frame Delimiter

PHR—PHY (Physical layer) Header

The frame includes a training sequence used for channel sounding and frame detection, in the form of an Ipatov sequence. This is a sequence of symbols forming a frame preamble, based on a predefined code sequence having certain properties that make it useful for channel sounding purposes (including perfect periodic autocorrelation).

If Device A knows the sending time of a frame, Tsa, and detects the receiving time of the response, Tra, and knows the response delay, td, then it can calculate the propagation time, tp as:

$$tp = \frac{Tra - Tsa - td}{2} \quad (1)$$

It can then multiply this by the speed of light to find the distance between Device A and Device B.

Because of multipath propagation, the receiver in each device will receive a signal consisting of multiple delayed, superimposed copies of the frames. The devices use the Ipatov preamble sequence as a training sequence for channel sounding to estimate the impulse response of the channel and therefore calculate the arrival times of each of these copies. They use the arrival time of the first copy as the true Tra.

The scheme as described in 802.15.4 is not secure because the Ipatov preamble sequence is a periodic sequence that repeats a pre-defined code. This can be spoofed by an attacker to make it appear to have arrived earlier than it actually arrived. For this reason, patent publication WO 2017/134310, the entire contents of which are incorporated herein by reference, introduced a secure scheme where the channel sounding sequence (also referred to herein as a training sequence) can be any random binary sequence that could, for example, be generated by a cryptographically secure random number generator (CSPRNG). In this case both the receiver and transmitter have access to the necessary information (including the generation algorithm and any seed and/or key information) to generate the cryptographic training sequence (at the transmitter), and to regenerate it (at the receiver) to detect the sequence on reception. This makes the channel sounding sequence secure from relay attacks. We shall refer to that sequence as the "DecaCypher". Note that the DecaCypher sequence is also referred to herein as the "cypher preamble" or simply "cypher" for short. The use of the term "preamble" in this context is not intended to imply that the DecaCypher sequence is located at or near the beginning of the frame, but rather indicates its function as a training/channel sounding sequence; in the presented examples the DecaCypher is typically located at the end or in the middle of the frame (with the Ipatov preamble at the start of the frame).

Figure 2:
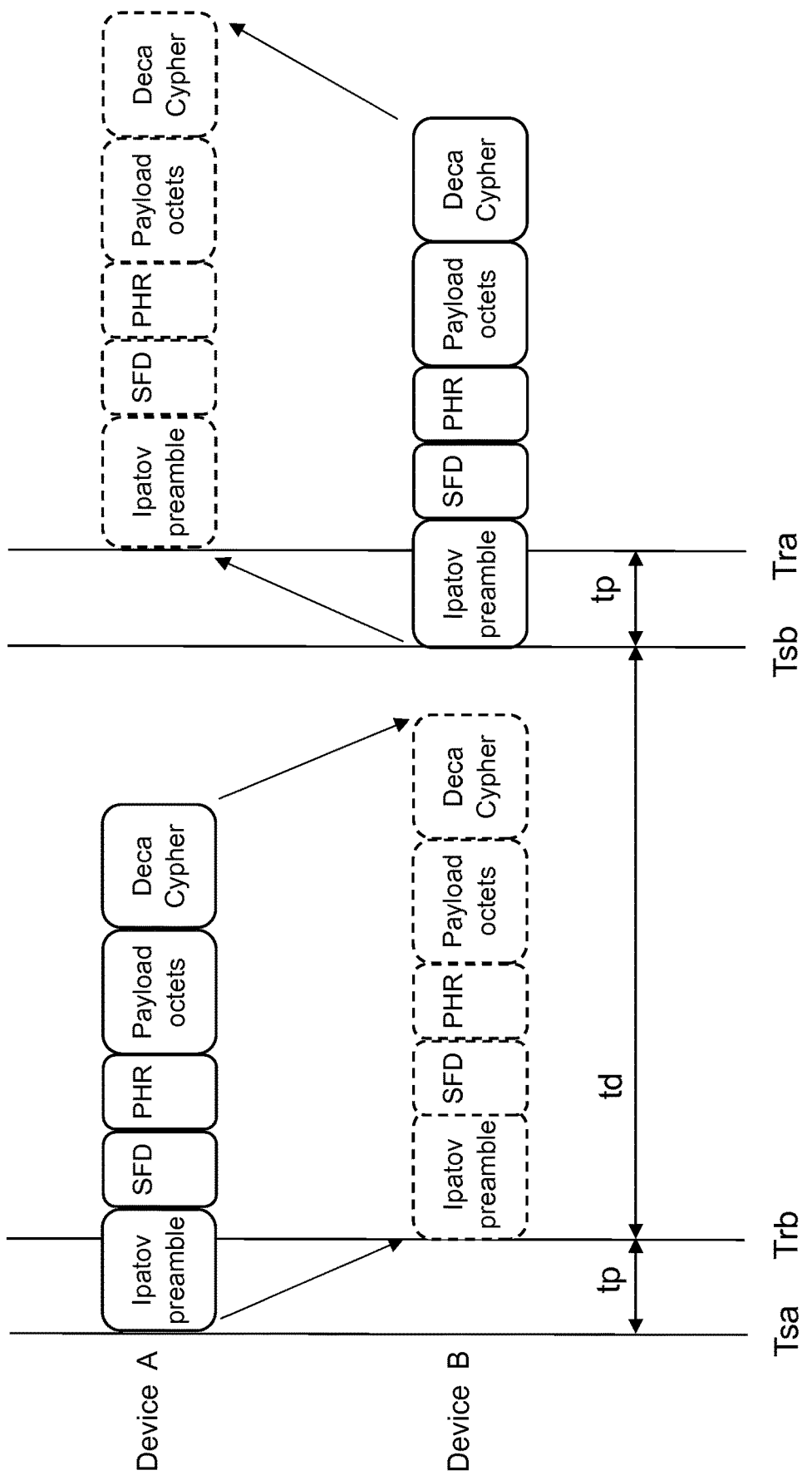
FIG. 2 illustrates on-air frames of a secure UWB two-way ranging protocol using DecaCypher.

One of the ways the DecaCypher is used in the above patent publication is shown in FIG. 2 (illustrating on air frames of a secure UWB two-way ranging protocol using DecaCypher).

The following described embodiments use transceivers that implement these frame formats.

Note that the term DecaCypher as used herein may refer to a secure training sequence as used in any of the embodiments described in WO 2017/134310, but other types of training/pilot sequences may alternatively be substituted. Preferably, these are cryptographically generated/secured training sequences, but in other embodiments (e.g. where security is of less concern) any other type of training sequence may be used as the DecaCypher element of the frame.

Unless required otherwise by context, the terms "frame" and "packet" are used herein interchangeably to refer to a structured data unit transmitted via the communication medium (in present examples wirelessly).

Figure 3A:
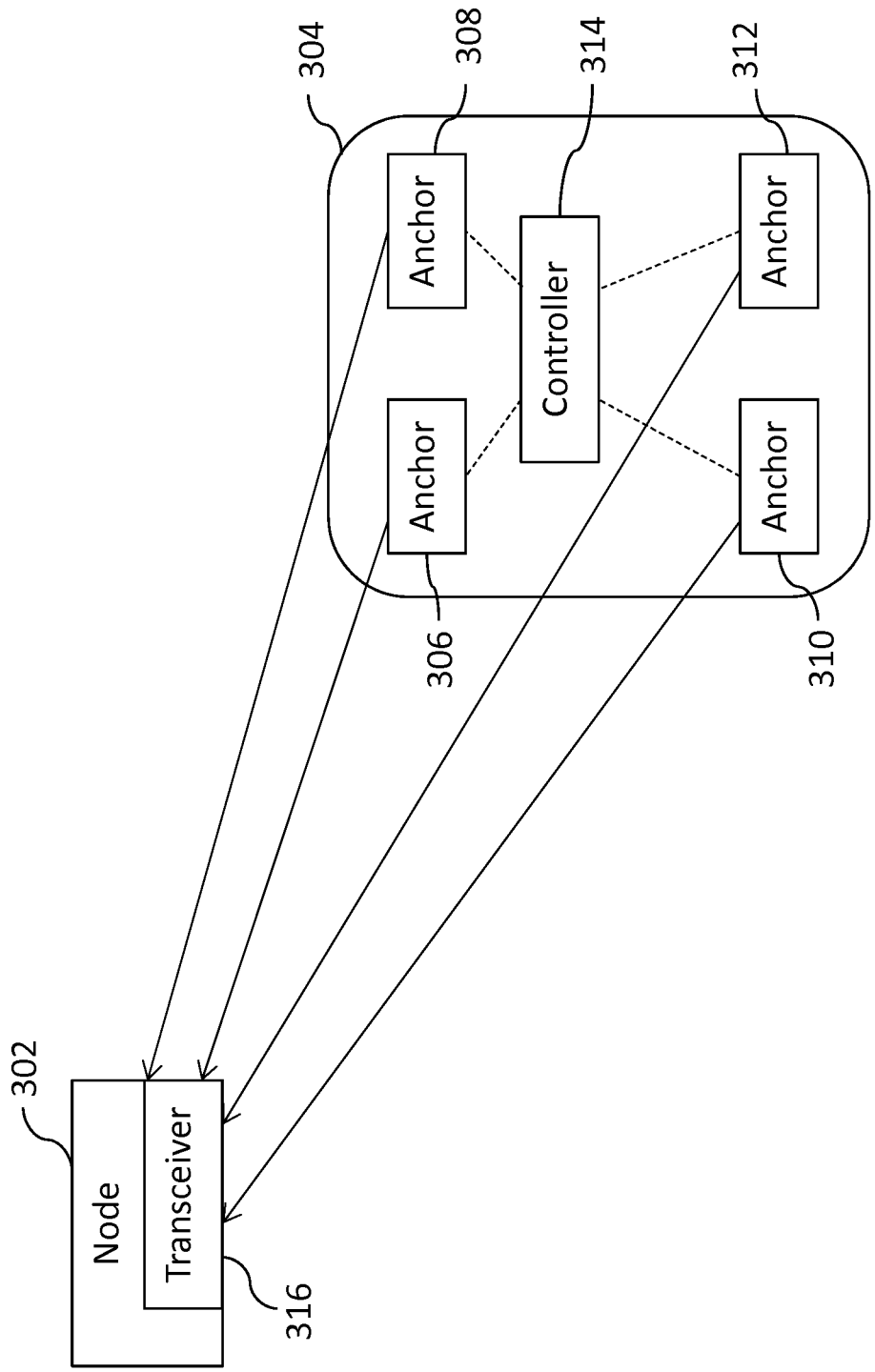
FIG. 3A illustrates communication with a node having multiple transceivers.

Embodiments of the invention employ variations of the above frame structures for communication between nodes, where at least one of those nodes includes multiple separate transmitters/transceivers. An example of such an arrangement is shown in FIG. 3A, which includes a first node 302 and a second node 304. The second node includes four separate transceivers 306, 308, 310 and 312, which are also referred to herein as "anchors", each associated with a respective antenna for transmission/reception of signals. Node 302 in this example includes a single transceiver 316 (though in other examples both nodes could include multiple transceivers). Communication between the nodes can occur via any of the anchors of node 304.

Described embodiments may use DW1000 or DW1100 transceiver integrated circuit (IC) modules (available from Decawave of Dublin, Ireland) in the transceivers in node 302 and/or node 304. However, any suitable transceiver technologies may be employed. In one embodiment, node 304 may include a controller 314 (e.g. a microprocessor) for receiving data from the multiple transceivers and for controlling and coordinating transmission of frames from the respective transceivers, using the various techniques, frame structures and frame timings described herein. However, in preferred embodiments the various communication schemes described herein operate without central coordination of the anchors. In particular, the anchors each receive messages from node 302 independently and generate response frames autonomously. However, since the anchors' responses are generated with predetermined timings relative to reception of messages at the anchors, the respective reply frames are still generated in a coordinated fashion and substantially simultaneously, except for minor differences due mainly to differences in signal propagation times between node 302 and the different anchors of node 304.

Figure 3B:
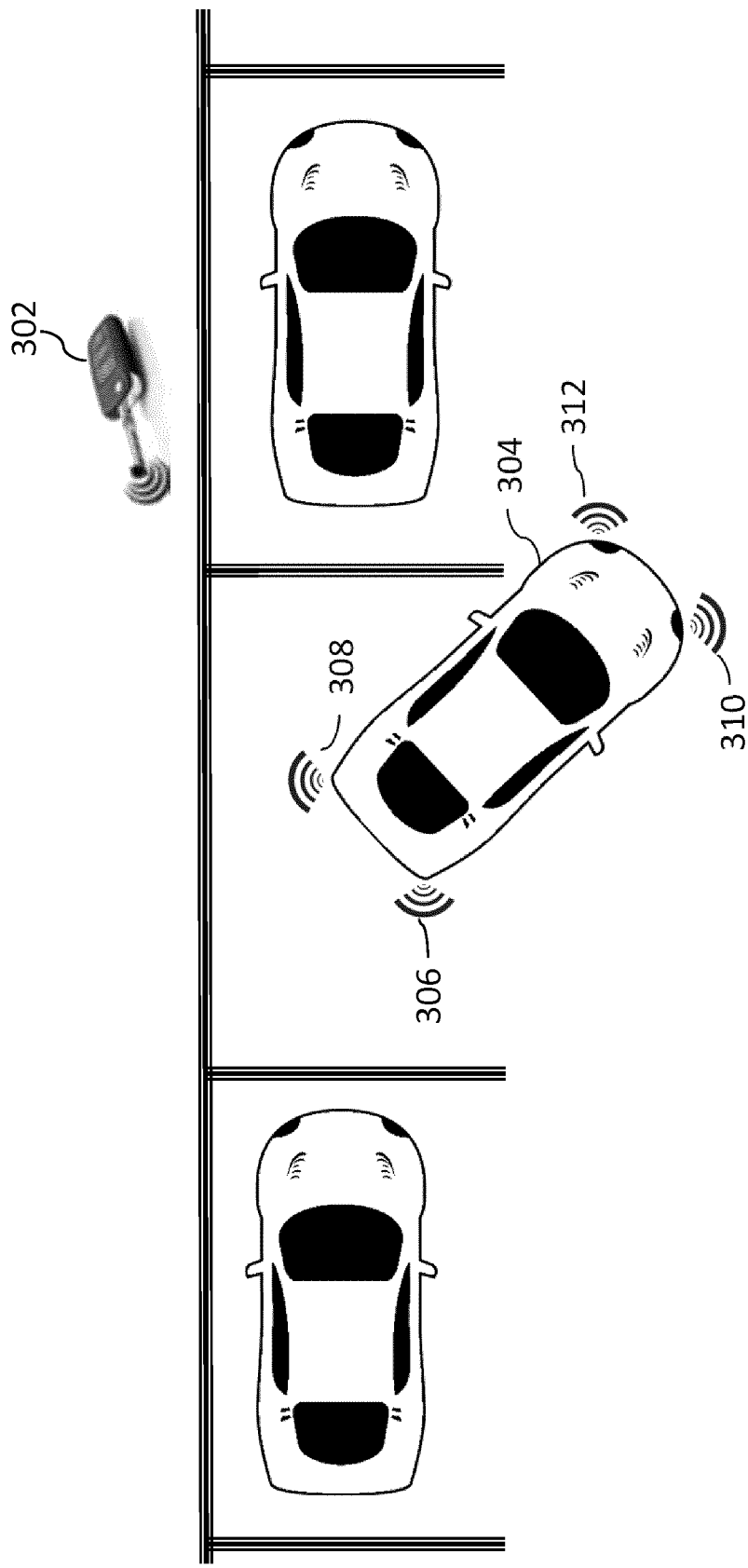
FIG. 3B illustrates an automatic parking scenario utilizing described communication techniques.

An example real-world application is illustrated in FIG. 3B. Here, node 302 is a wireless key fob for a car or other vehicle, and node 304 is the vehicle, which includes the transceivers or anchors 306-312 (e.g. positioned at respective front and rear corners of the vehicle). In this embodiment, the described communication schemes are used to implement an automatic parking function of the vehicle.

In this scenario, a car is being parked automatically with the driver nearby to make sure nothing goes wrong. Regulations state that the driver shall be no more than 6 m away from the car. There is a transceiver on each corner of the bumpers of the car ready to respond to a signal from the keyfob. At any particular time, the driver may have an unobstructed view of only one of the antennas and the best antenna to use may change constantly as the car manoeuvres itself. For safety reasons, if the car stops receiving an "All Clear" signal from the keyfob, the car must stop the automatic parking procedure within a short time, e.g. of the order of 100 ms.

Figure 4:
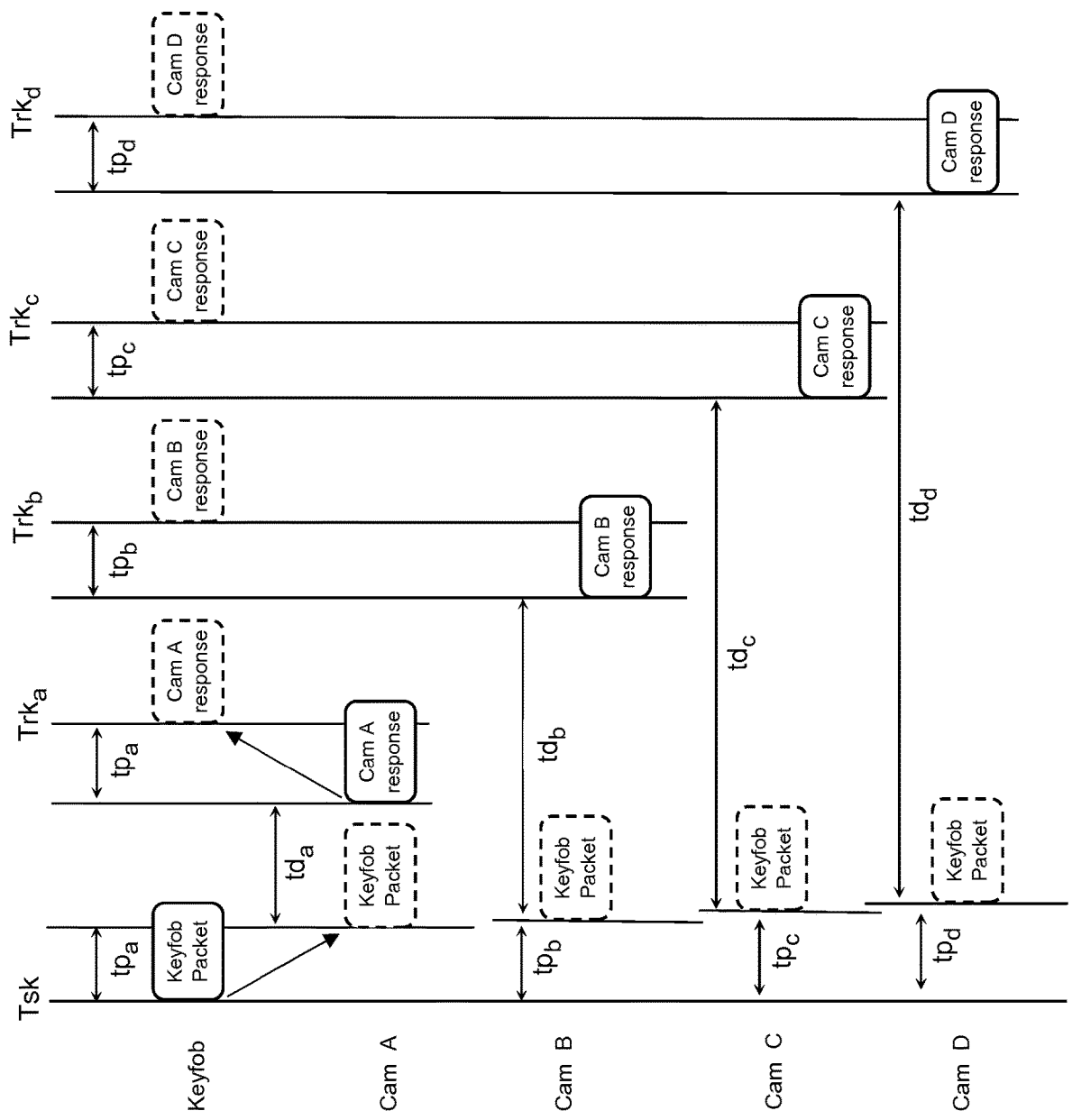
FIG. 4 illustrates two-way ranging to multiple anchors (cams)

One way to address this is for the keyfob to transmit a frame every 100 ms. Each of the four transceivers/anchors in the car, which we shall refer to as "Cams", is programmed to respond to the keyfob after a different pre-programmed response time, e.g. after 20 ms, 40 ms, 60 ms and 80 ms. Since the keyfob has a relatively clear view of at least one antenna, and since it is pre-programmed to be ready and listening for each of these at the appropriate time, it will usually receive at least one of the frames. This communication scheme is illustrated in FIG. 4.

We can re-use equation (1) to find the propagation delay to each Cam, e.g. for Cam C $$tp_c = \frac{Trk_c - Tsk - td_c}{2} \qquad (2)$$

There are a few problems with this. One is that the keyfob usually has a small capacity battery and it takes a lot of power to send one frame and then receive four frames. In addition to battery capacity, it will often require large capacitors to avoid drawing too much instantaneous current from the battery. The more frames that are received, the larger these capacitors must be.

Ranging with Simultaneous Frames

Embodiments of the invention provide an alternative solution, using a scheme referred to herein as "simulranging". While for clarity and ease of understanding the scheme will continue to be described in the context of a keyfob communicating with a vehicle—e.g. in the automatic parking scenario or in a secure door locking/unlocking application—it should be noted that the scheme is not limited to this application but can be applied in any appropriate context involving communication between nodes or devices, at least one of which includes multiple transceivers.

In this scheme, all four cams send their frames quasi-simultaneously, but only the one is received by the keyfob. Each transceiver in the car is programmed to respond to an initial message from the keyfob after a slightly different time delay, for example, 100 μs, 101.25 μs, 102.5 μs and 103.75 μs respectively, from reception of the message from the keyfob at the respective transceiver. This means that they are all responding almost simultaneously, but with an important 1.25 μs spacing. The receiver in the keyfob is programmed to be ready to receive a frame after 100 μs and it will "see" some of the frames, maybe only one but maybe all of them. The 1.25 μs gap means however that it only actually decodes the frame of one of the responses and only estimates the channel impulse response of one of the frames, because the symbol boundaries of the respective Decacypher training sequences (which have symbol durations of approximately 1 µs) are not aligned. More generally, the respective offsets may be any non-integer multiples of the Decacypher symbol duration so as to prevent symbol alignment of the Decacypher sequences.

Thus, the specific offsets are given purely by way of example (elsewhere herein, offsets of e.g. 128 ns are suggested). It is preferable that the offsets are larger than the expected delay spread (e.g. for multipath delays), so that (for example) multipath from one transmitter would not overlap its energy onto the accumulator area of another transmitter.

Figure 5:
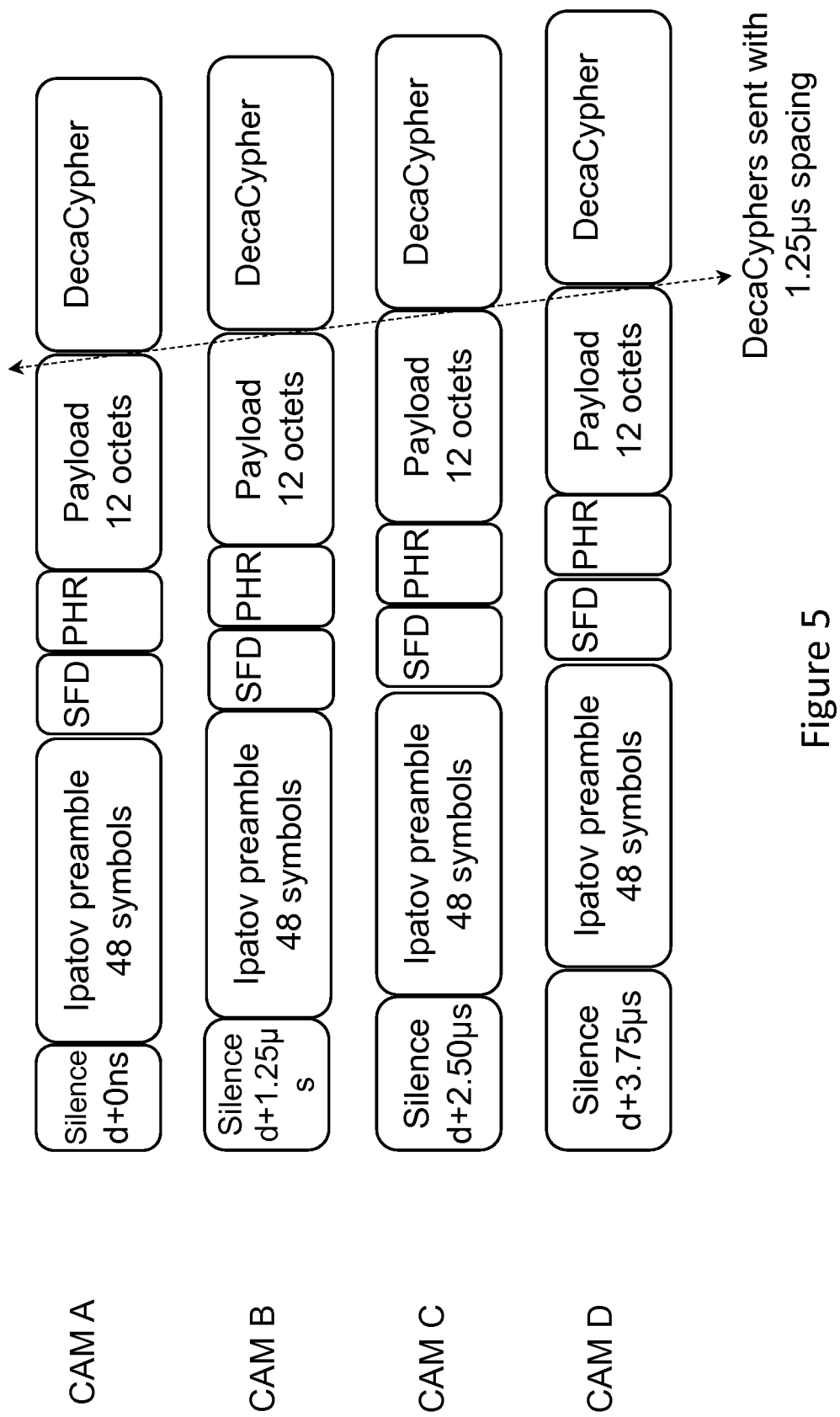
FIG. 5 illustrates use of quasi-simultaneous frames in accordance with one disclosed communication scheme.

The frames on the air, as described, will appear as shown in FIG. 5.

This is what the receiver (e.g. the key fob) does as it receives a frame:
  starts up in Ipatov preamble detection mode.
  In preamble detection mode, it continually assumes that a signal is present and constructs CIR (Channel Impulse Response) estimates for whatever it receives
  When it decides that the CIR estimate is coming from an actual valid signal it switches to acquisition mode.
  In acquisition mode it uses an accumulator to sum many noisy channel estimates to construct a 1 µs long channel impulse response (CIR) and starts the carrier recovery algorithm.
  The carrier recovery algorithm only gathers information from a 64 ns section of the full CIR that contains the most energy.
  In acquisition mode it is also searching for the SFD signalling the end of the preamble. Again, just gathering information from the 64 ns window.
  When the SFD is found the receiver prepares to receive the payload. The Ipatov CIR estimate is complete.
  The payload is demodulated, again, only using information from the same 64 ns section of the CIR.
  When the payload demodulation is finished, it constructs a second, secure, CIR estimate using the Decacypher.

Figure 6:
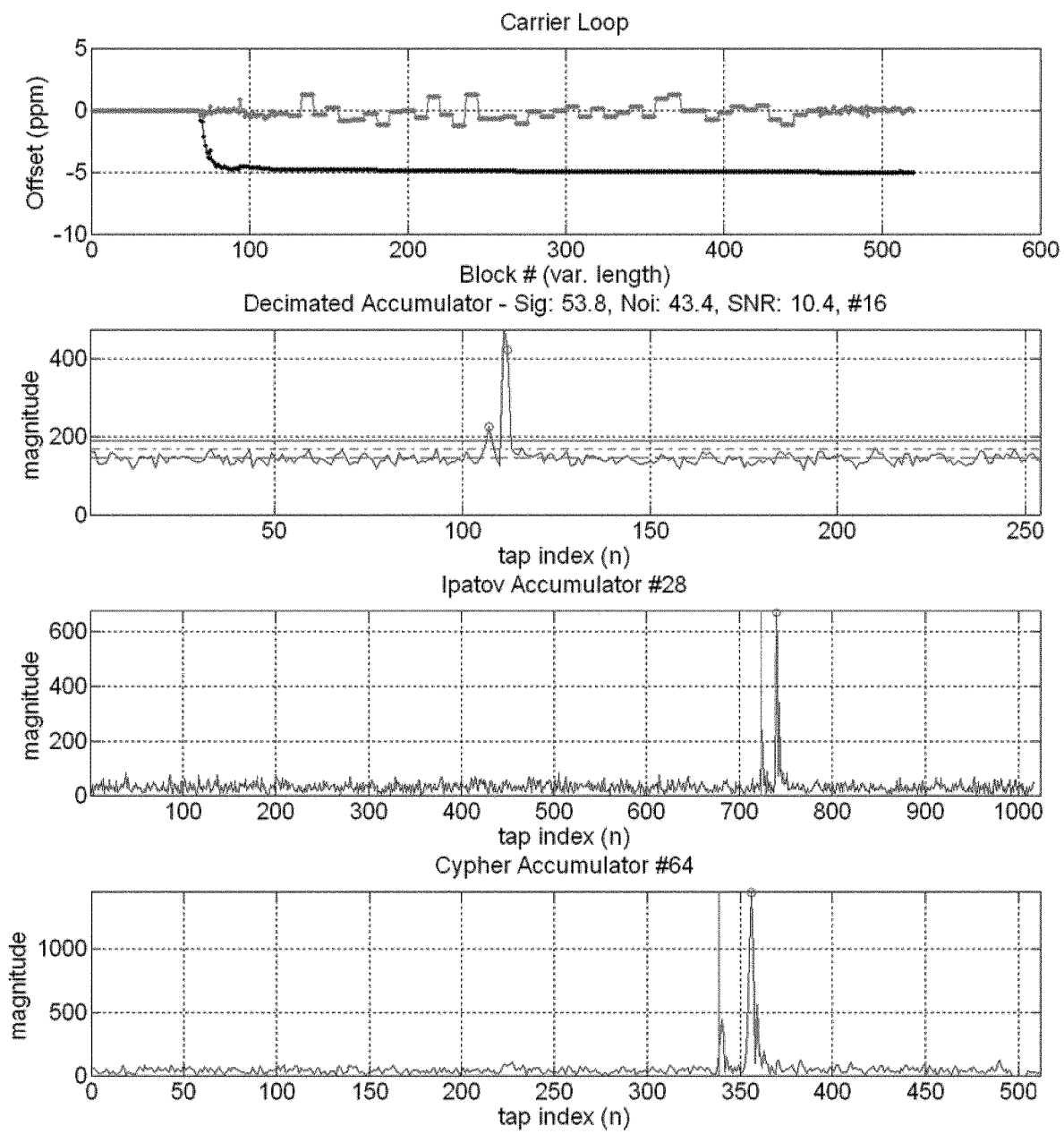
FIG. 6 illustrates typical carrier loop and accumulators for CFO=−5 ppm.

FIG. 6 shows the accumulators and the carrier loop for a typical receive frame which has a −5 ppm (parts-per-million) carrier frequency offset (CFO) and where there is a weak path followed by a peak path which is 10 dBs stronger and delayed by 15 ns.

The top subplot is the carrier recovery loop homing in on the −5 ppm offset. The second subplot shows the accumulator formed from preamble detection. The receiver picks the strongest signal here and adjusts its delay so that this signal appears at approximately tap index 728. It then focusses its carrier and timing recovery on this signal during reception of the Ipatov preamble and to accumulate its Ipatov based channel estimate. The third subplot shows the channel estimate built up from the Ipatov preamble. The fourth subplot shows the channel estimate built up from the Deca-Cypher.

A simulation of a receiver with all four of the frames shown in FIG. 5, arriving simultaneously, was simulated in Matlab. Four frames with different carrier frequency offsets (CFOs) were transmitted almost simultaneously. The receive power for 3 of the frames was −90 dBm, while the fourth frame receive power was −88.5 dBm. The channel for each signal was a two-path channel where the first path is 10 dB weaker than the main path.

Frame 1) Sent after delay of 40 µs. Cfo=−5 ppm. Rx level=−90 dBm.
Frame 2) Sent after delay of 41.25 µs. Cfo=−4 ppm. Rx level=−88.5 dBm.
Frame 3) Sent after delay of 42.50 µs. Cfo=−3 ppm. Rx level=−90 dBm. Frame 4) Sent after delay of 43.75 µs. Cfo=+5 ppm. Rx level=−90 dBm.

Figure 7:
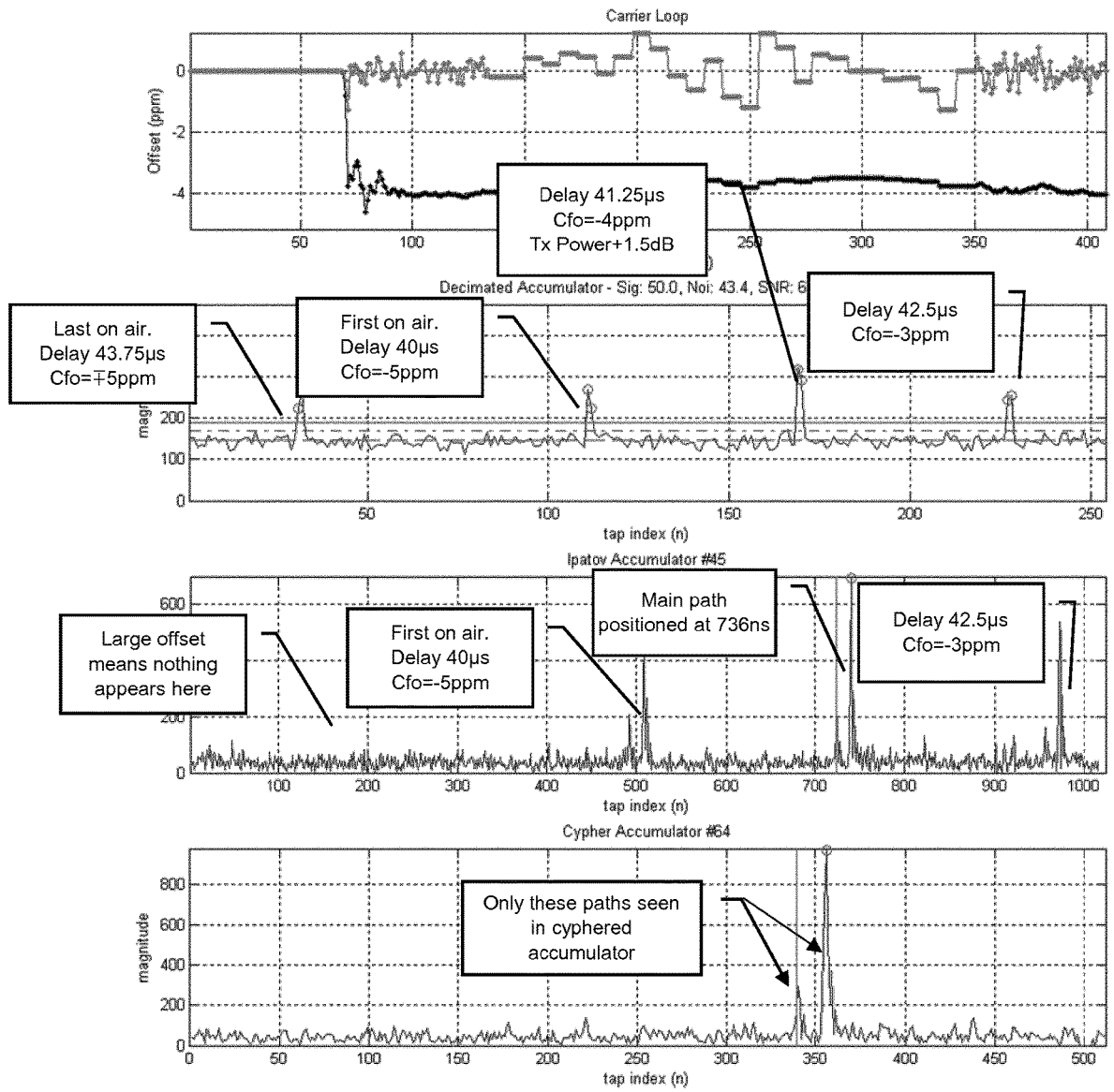
FIG. 7 illustrates simulation results for four quasi-simultaneous frames.

FIG. 7 shows the receiver response to the (quasi-) simultaneous frames according to the simulation.

The top subplot is the carrier recovery loop homing in on the −4 ppm offset of the strongest signal. The second subplot shows the accumulator formed from preamble detection. The receiver picks the strongest of the four signals seen here and adjusts its delay so this strongest signal appears at approximately tap index 728. This will generally be the nearest line of sight (LOS) corner of the car. It then focusses its carrier and timing recovery on this signal during reception of the Ipatov preamble and to accumulate its Ipatov based channel estimate. The third subplot shows the channel estimate built up from the Ipatov preamble. Three of the four frames produce strong paths in this estimate. The signal due to the fourth frame is not present because its CFO is 9 ppm different than the signal being followed. The fourth subplot shows the channel estimate built up from the Cyphered preamble. Only one frame produces any paths in this estimate. The signal due to the second frame is the only one whose delay matches the delay the receiver has homed in on. The other three frames are more than 1 µs away. The Decacypher uses groups of symbols of length 1 µs, so symbols which are more than 1 µs away from another symbol have zero correlation with it.

Security Enhancements

The simulranging scheme as outlined above is not secure, even though the Decacypher is being employed. The four frames all have the same Decacypher sequence but they are sent with a delay between them. An attacker could listen to the first sequence and he would then have 3.75 µs to use a record and replay attack on the fourth frame sending the same sequence slightly earlier than the one he knows will be transmitted hence reducing the true time of flight (TOF). This may not matter in an Auto Parking application, but it may matter in other applications, e.g. in a passive entry system.

Figure 8:
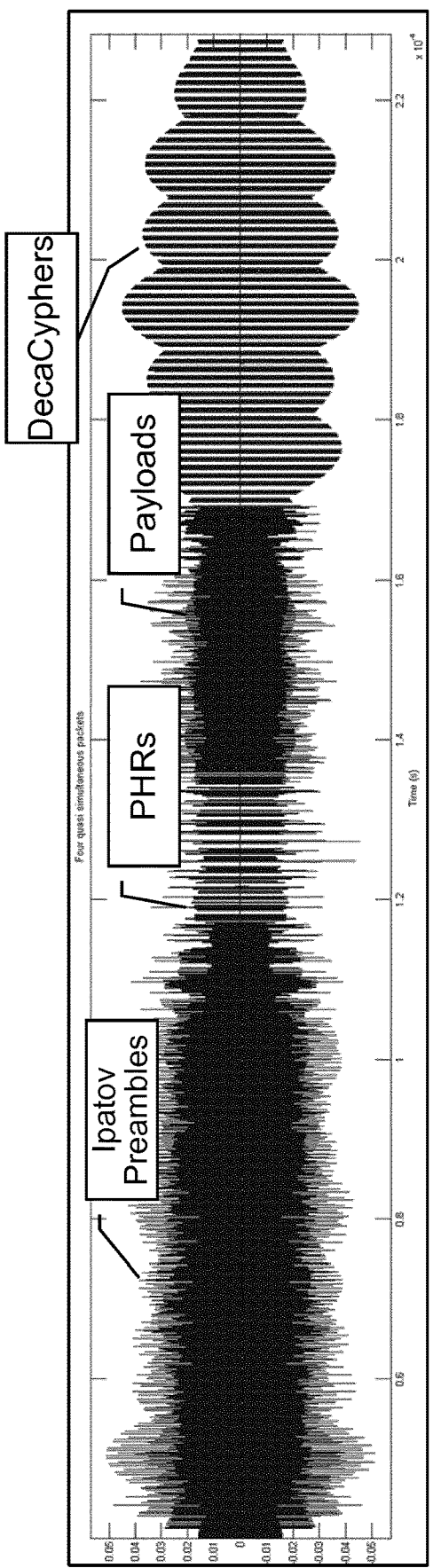
FIG. 8 shows a time domain plot of four quasi-simultaneous frames.
Figure 9:
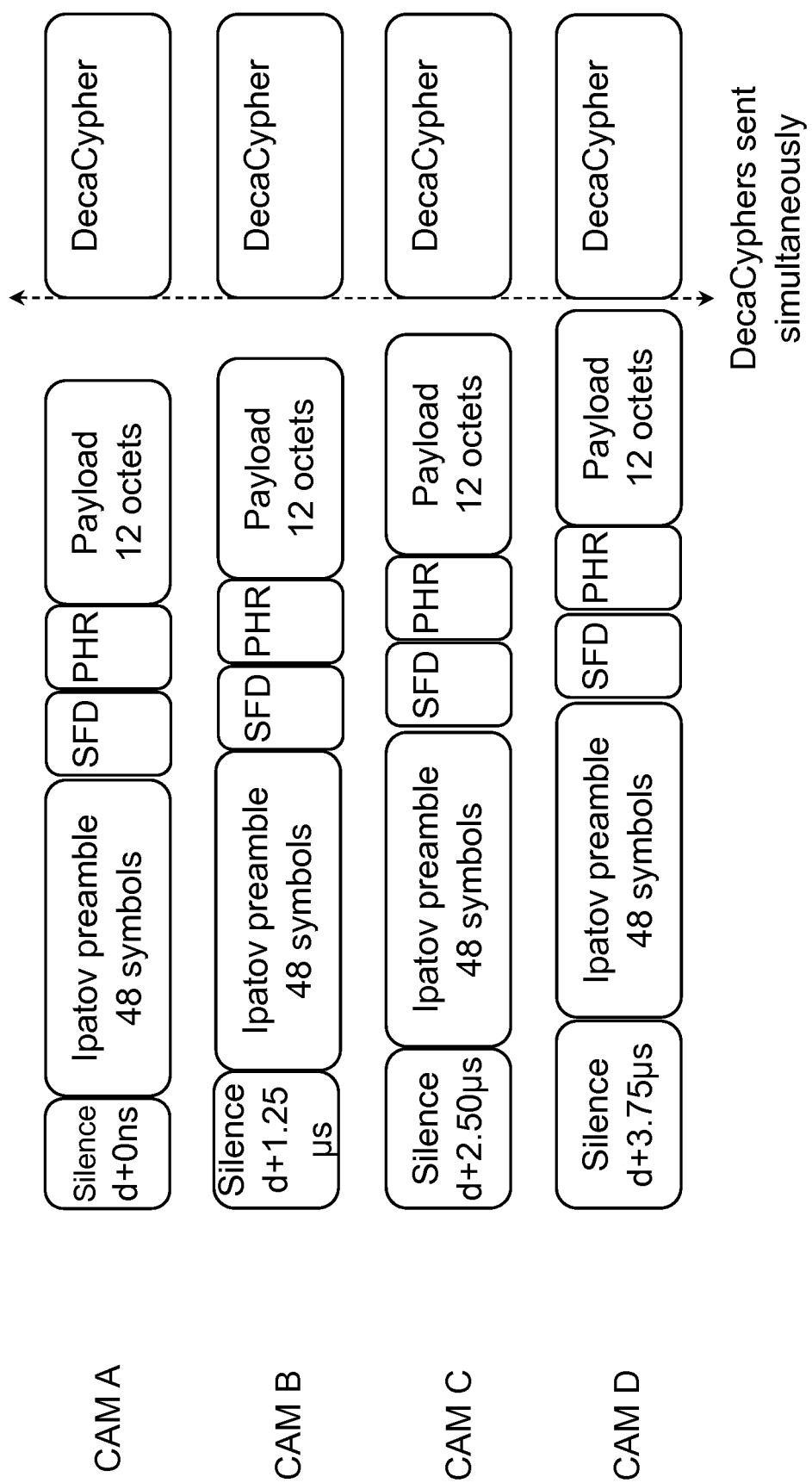
FIG. 9 illustrates an alternative communication scheme using quasi-simultaneous frames with simultaneous DecaCyphers.

The scheme can be modified to be secure as shown in FIG. 8 and FIG. 9 and described below.

FIG. 8 shows a time domain plot of four quasi-simultaneous frames.

FIG. 9 illustrates quasi-simultaneous frames with simultaneous DecaCyphers. Here, each frame is sent as before with a time offset of 1.25 µs (relative to a preceding frame sent by another transceiver), but the DecaCyphers are all sent aligned, i.e. in each frame, a gap is inserted between the payload and the Decacypher so that the sum of that inserted gap and the time offset at the start is equal to some constant so that each Decacypher is transmitted with the same delay after reception of the keyfob message by the transceiver—and thus each Decacypher is transmitted in effect simultaneously from each of the four transceivers (except for minor variations due to different propagation times between the keyfob and the different transceivers).

Of course, the receiving IC in the keyfob only "sees" one of the four frames and it cannot tell which one that is, so it does not know the gap between the payload and the Decacypher. For this reason, it signals the length of the gap before the Decacypher arrives. This gap length can be encoded in the PHY header (PHR) or in the payload. The payload is typically encrypted, so it may take some time to decode, for this reason, the PHR may typically be a more suitable place to encode it. The PHR is not encrypted, so there is the potential to attack it and perhaps fool the receiver into thinking it came earlier than it actually did. To combat this concern, the transmitter can also encode the same bits in the payload (possibly encrypted) for later verification.

This is now secure and saves a large amount of energy in the keyfob. It only needs to do one frame reception, but receives the frame from the best positioned transmitter.

In this revised secure scheme, it may happen that all the signals at preamble detect time are of a similar strength. The receiver might then pick out the furthest away signal to train its carrier and timing recovery and compose its channel estimate. The cyphered signal would then arrive and it could happen that a closer transceiver has a very similar CFO. The cypher pulses from this transceiver will appear ahead of the pulses of the farther transceiver and seemingly corrupt the channel estimate. In fact, this is not a corruption, this is just indicating that there is actually a closer transceiver than the one that was originally locked onto.

Figure 10:
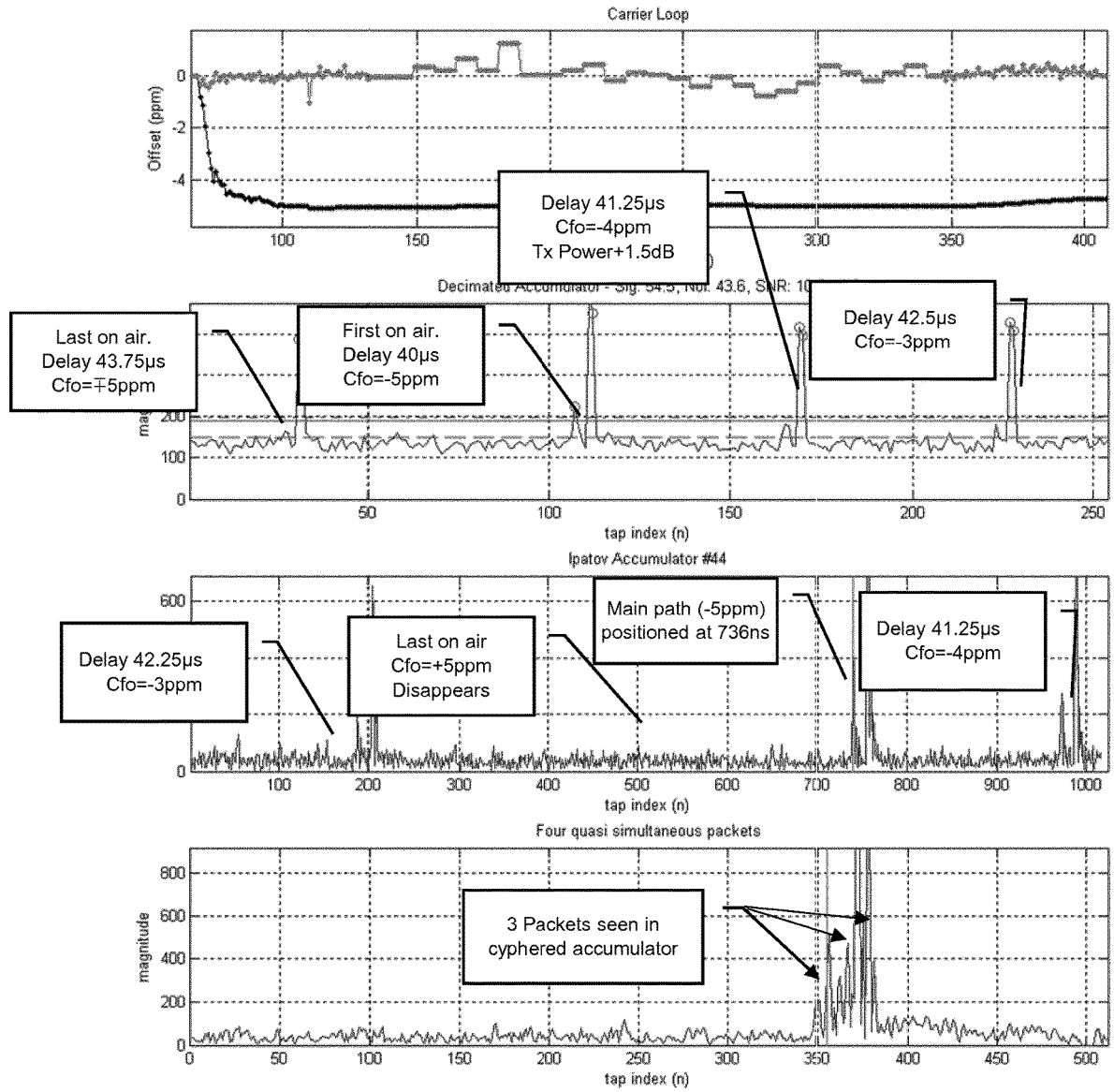
FIG. 10 illustrates simulation results for four quasi-simultaneous frames with simultaneous DecaCyphers.
Figure 11:
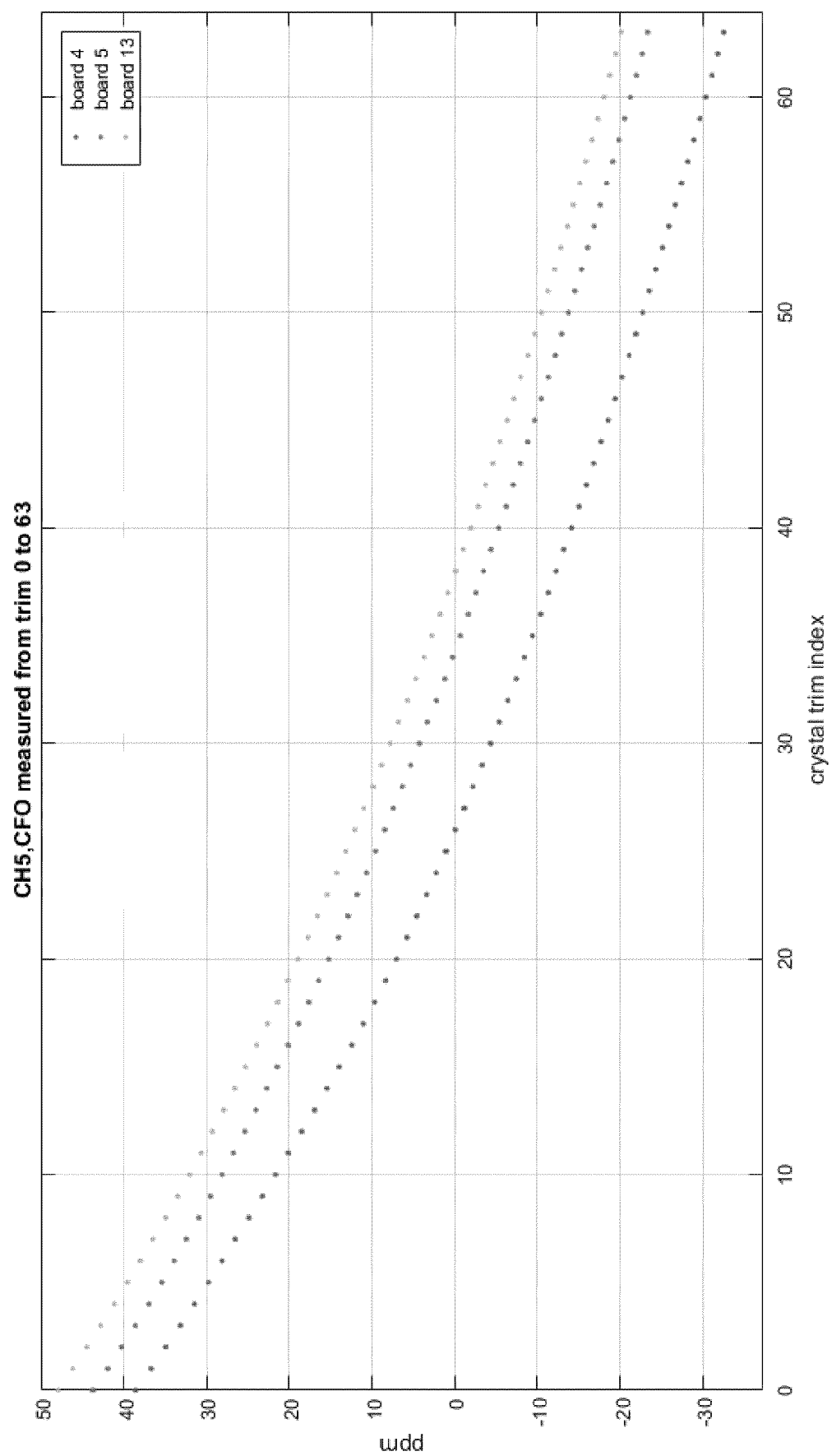
FIG. 11 shows CFO trimming measurements.

FIG. 10 shows the corresponding algorithm outputs for this case (simulation of 4 quasi simultaneous frames with simultaneous DecaCypher).

Adjusting Clocks in the Anchor to a Target Offset

When there are different clock offsets between the keyfob and the transceivers, the precise values of the various delays may change by a small fraction, depending on which device is counting the delays. These delay variations can add up and cause perceived arrival times to move around. This can cause complications. Embodiments of the invention address this utilizing a facility provided in some modern ICs for making small adjustments to the frequency of the source clock by, for example, making small adjustments to the values of the crystal trimming capacitors. They can achieve a target frequency with an error of less than 1 ppm. In many receivers, the CFO can be measured. This allows the IC, after receiving a frame at a particular CFO and having measured that CFO, to trim its source clocks to be a desired value. This would take effect before they transmit their response to that frame. For example, to make sure all the receivers in the car start their silence transmission at exactly the same time, they could all set their CFOs relative to the keyfob, to the same value. In many receivers a small negative offset provides other benefits, so they could all aim for a CFO of say, −2 ppm. For other reasons, it might be desirable to have different clock offsets for each receiver, and they could each have different targets, e.g. −20 ppm, −15 ppm, +10 ppm and +20 ppm.

An important aspect of the crystal trimming procedure is that it allows all anchors to get synchronized to the same CFO. Therefore, even if keyfob locks on to one anchor, paths from other anchors will also be easily seen in keyfob accumulators. This is explained in more detail below. Alternatively, if the CFOs are not tuned to a common CFO, then it is likely that only the anchor to which the receiver synced during acquisition of the Ipatov preamble will be seen.

If the initial CFO is large, the first trimming may not result in perfect convergence to the target CFO. This is due to certain unpredictability of the crystal trimming function and its variability from device to device. In embodiments, crystal trimming is therefore done in two steps. The first step involves an initial short message from the keyfob to the anchors consisting only of short Ipatov preamble (and possibly with SFD to confirm preamble validity). There could be no cypher or data payload. Due to that, Ipatov preamble length could be reduced to a minimum, for example 16, 24 or 32 symbols. Crystal trimming is performed initially based on this preliminary message, and subsequently repeated based on the full data frame as previously described to improve convergence to the target CFO.

Compensating for 8 ns TX Transmission Grid

The digital part of the DW1100 IC is clocked with a 125 MHz clock. This means that it can only start transmission at predefined 8 ns time grid clock edges. That could mean that depending on the packet, transmission can be delayed by 0 to 8 ns from the ideal transmit time and this delay varies from packet to packet. Normally the data payload would be used by the transmitter to inform the receiver what delay was required and the receiver would subtract it. With simulranging and multiple packets, it is impossible to decode all 4 payloads and compensate for all 4 packets. Without this compensation the first path uncertainty can be up to +/−4 ns. This is discussed further in the "Example Scenario" section below.

In an embodiment, the 8 ns transmit time uncertainty is removed in the transmitter. Once the offset of the grid time from the ideal time is calculated, the transmitter alters its crystal clock rate and speeds it up or slows it down by a certain number of parts per million (ppm) for a certain time, depending on the compensation required. For example, speeding up the crystal by 30 ppms for 100 μs moves the grid point edge earlier by 3 ns.

The correction may be done relative to the later 8 ns grid edge by speeding up the clock or to the earlier 8 ns grid edge by slowing down the clock.

Accurate compensation can be controlled by varying both the crystal trim (range available is typically of the order of +1-40 ppm) and the de-tuning period (which typically could be between 100 and 300 μs).

Transmit Power Reduction

Embodiments may implement various approaches to controlling the transmit power. TX (transmission) power can be changed per anchor and also individually within each transmitted packet (for example certain parts, like the payload, can be transmitted at a lower power level than the preambles). Reducing transmit power for a given portion of the frame, or disabling transmission for a portion altogether (or equivalently reducing transmit power to zero for the portion) is also referred to herein as "muting" the portion.

If the whole car is treated as one transmitting device, then transmit power of each individual transmitter (anchor) can be reduced to avoid exceeding aggregate power limitations. In one approach, if another protocol is available to pre-select anchors to transmit, each individual anchor may have its TX power set dynamically within a total TX power budget, depending for example on expected signal strength, number of anchors transmitting etc.

In one variation, the keyfob initiates the exchange and anchors respond, and the anchors adjust their TX PWR (transmit power) to prevent 'shadowing' of other weaker anchors by its very strong signal. An anchor which sees a very strong $1^{st}$ path from the keyfob, can significantly reduce its transmit power knowing that the keyfob will have no problems seeing its $1^{st}$ path, even after power reduction. Power reduction by the strongest anchors makes it easier for the keyfob to see weaker $1^{st}$ paths from other anchors. The algorithm used to reduce the anchor's TX power can take into account multiple factors, for example, Receive level (RSL) of the $1^{st}$ path, total RSL including multipath received from the keyfob, knowledge of transmit power applied at the keyfob side, the anchor's own minimum/maximum/default TX PWR settings, the number of anchors potentially transmitting, the lengths of the packets, total TX PWR budget, minimum receiver RSL required to detect weak path, etc.

Some schemes presented in this document suggest reducing or muting TX power in certain parts of a frame (for example during the Ipatov preamble or data payload) and boosting power during the cyphered training sequence (DecaCypher). In the case of an attenuated (weak) $1^{st}$ path, this approach can maximize chances of detecting this $1^{st}$ path.

Stopping the Receiver/Transmitter Before the End of the Packet

This technique allows for receiver and/or transmitter power saving by shutting down the receiver or transmitter RF chain early. For example, in cases where a data payload is not needed but a PHR and data is still transmitted after the cyphered preamble (DecaCypher), the receiver/transmitter can be shut down immediately after the last cyphered symbol.

In order to stop the RF chain immediately after the cypher, the following pseudo-code is executed:
1. trigger an interrupt after SFD detection (or SFD transmission)—this takes around 20-30 µs
2. in the interrupt, issue an SPI command to turn off the receiver or the transmitter—this takes around 10 µs. The cypher takes 64 µs and we don't want to cut it off in the middle, so a delay is used.
3. setup a timer after the SFD detection interrupt and then send a command to stop receiving/transmitting at the estimated time.

Shortening the Ipatov Preamble Length

The channel estimate is used to set the coefficients of the channel matched filter (CMF). This filter is much shorter than the complete channel estimate, e.g. in the DW1000 it is 64 samples long, whereas the channel estimate is about 1000 samples long. The carrier recovery, SFD detection and data demodulation blocks are fed energy from the output of CMF, so that a restricted portion of the complete channel estimate taps are used for these functions.

The Ipatov sequence can be shorter than usual if a good initial CFO estimate is available or for other reasons. Circumstances allowing this could include:
where previous messages were received from the same device which have already meant that the receiver knows that CFO target will be close to zero.
if all anchors transmit at the same CFO and the key fob knows this target CFO so it can pre-initialize its starting point for carrier offset estimate.
if all anchors transmit at the same time, within the same receiver CMF window, which determines samples used for carrier recovery locking (that is, without 64 or 128 ns timing offsets)
weak path detection in the resulting Ipatov accumulator is not a concern because only the cypher accumulator is used for first path detection.
there is no data demodulation so no need for an accurate CMF for data demodulation (CFO and SFD detection don't require the CMF to be as accurate as data demodulation does.)

Implementing Secure Simulranging with the DW1100

Note that the following sections provide additional detail on implementing the described techniques using a transceiver based on the Decawave DW1100 transceiver IC. However, the described approaches may be adapted to any other suitable transceiver technology.

Figure 12:
FIG. 12 shows a protocol frame as used, e.g. in a DW1100 implementation.

The Decawave IC (DW1100) utilised in these embodiments does not allow the secure simulranging scheme to be implemented as described above and illustrated in FIG. 9 (using a variable transmission gap prior to the DecaCypher field). However, instead, frames can be configured as shown in FIG. 12.

In this scheme, in order to maintain a 128 ns timing difference between Ipatov pulses (to avoid multipaths adding within the same CMF window), payload sizes are varied so as to differ by 16 octets. This is because each payload symbol is 8 ns longer than an Ipatov symbol, thus introducing 16*8 ns=128 ns timing shift. While payload sizes differ by 16 octets, the smallest payload can be only 1 octet in size (the next ones would then be 17, 33, 49 octets respectively).

Figure 13:
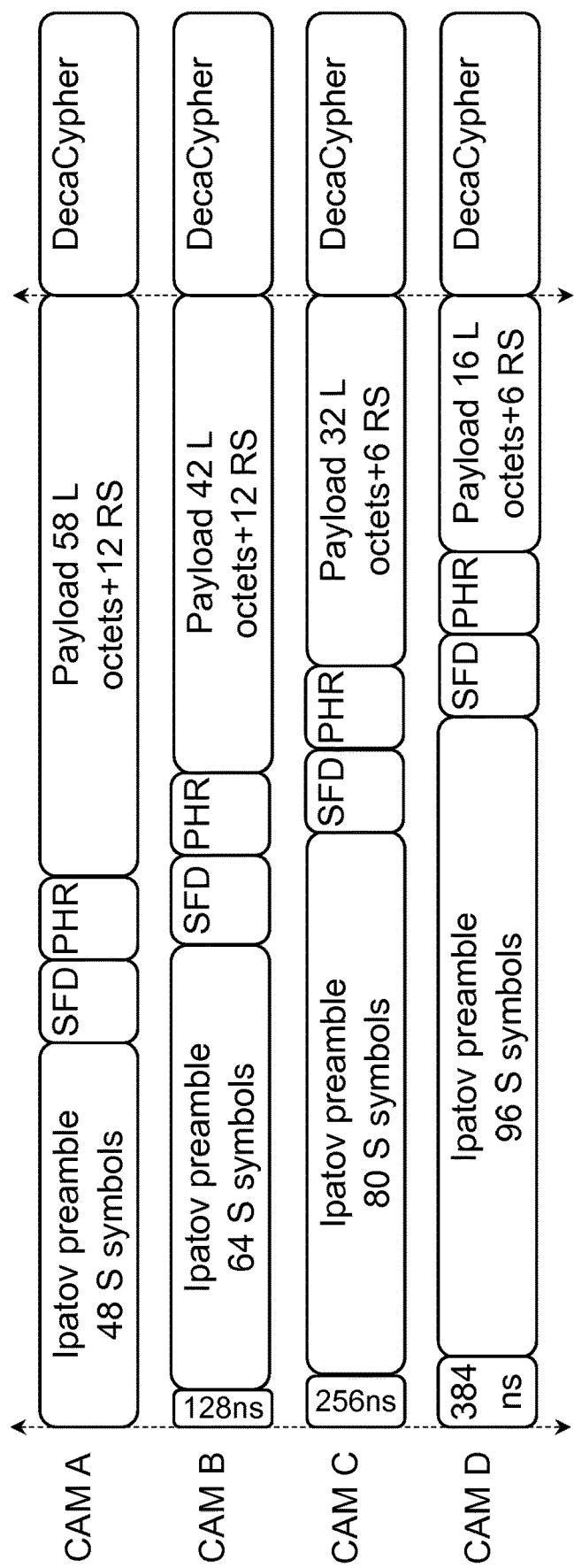
FIG. 13 illustrates a variation of the communication scheme with simultaneous DecaCypher sequences as implemented, e.g. using DW1100 transceivers.

Using this approach, the four Anchors/CAMs in the car are configured to respond as shown in FIG. 13, where Ipatov preamble and payload lengths are varied to balance out the varying delay at the start of each frame.

The Ipatov preamble and SFD symbols, (shorter "type S" symbols), are all ~1016 ns long whereas the PHR symbols, Payload octets and Decacypher symbols, (longer, "type L" symbols or octets), are all ~1024 ns long. This means that if a payload octet is removed from the frame, and at the same time one Ipatov symbol is added, the total frame length decreases by ~8 ns. In this way, we can shorten the portion of the frame that comes before the DecaCypher to offset the amount of silence that comes before the individual responses so that all four of the DecaCyphers are coincident in time and therefore none of them can be predicted by listening to one of the other ones. The receiver knows when the Decacypher will arrive because the payload length is encoded in the PHR. As an aside, the PHR is not protected by an encryption scheme, but when security is required, the payload will be encrypted. Some hacking techniques can make use of this, so, if security is required, the encrypted payload can also contain a confirmation of the payload length.

In some cases there can be a slight complication in setting the payload sizes in this way. The Reed-Solomon code adds an error correction block of 6 octets for every 330 bits in the payload. This means that if any of the payload sizes goes above 41 octets, a second check block will be added to it. This requires the other payload blocks to be padded with 6 dummy octets. Of course, the frame durations could also be equalised by increasing the initial silence time, and/or adding extra Ipatov preamble symbols.

Why do these Simultaneous Frames not Interfere with Each Other?

Figure 14:
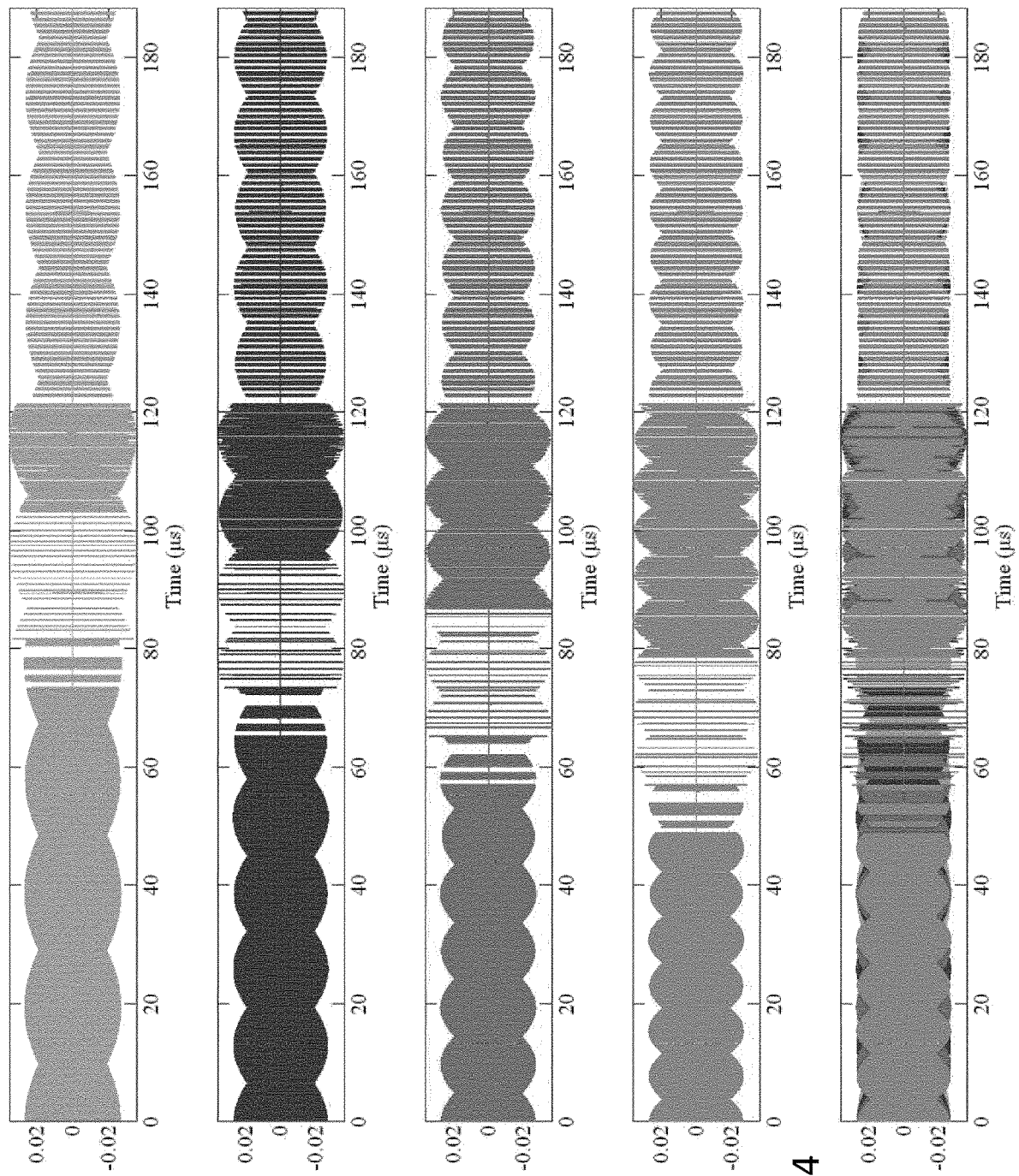
FIG. 14 illustrates four quasi-simultaneous frames, separate and superimposed.

To understand why the above scheme works, it helps to look at an example simulation. FIG. 14 shows an example four frames all on the air at the same time. Each frame has a different silence inserted at the start. The silence lengths are 192 ns, 256 ns, 128 ns, 0 ns respectively. Then each frame has a different Ipatov preamble length. The lengths are 72, 64, 56 and 48 symbols respectively. The payload lengths are 12, 20, 28 and 36 octets respectively. This ensures that each frame's Decacypher is sent at the same time which is important to maintain security. FIG. 14 shows the four quasi-simultaneous frames separately in the first four plots and superimposed in the final plot.

Figure 15:
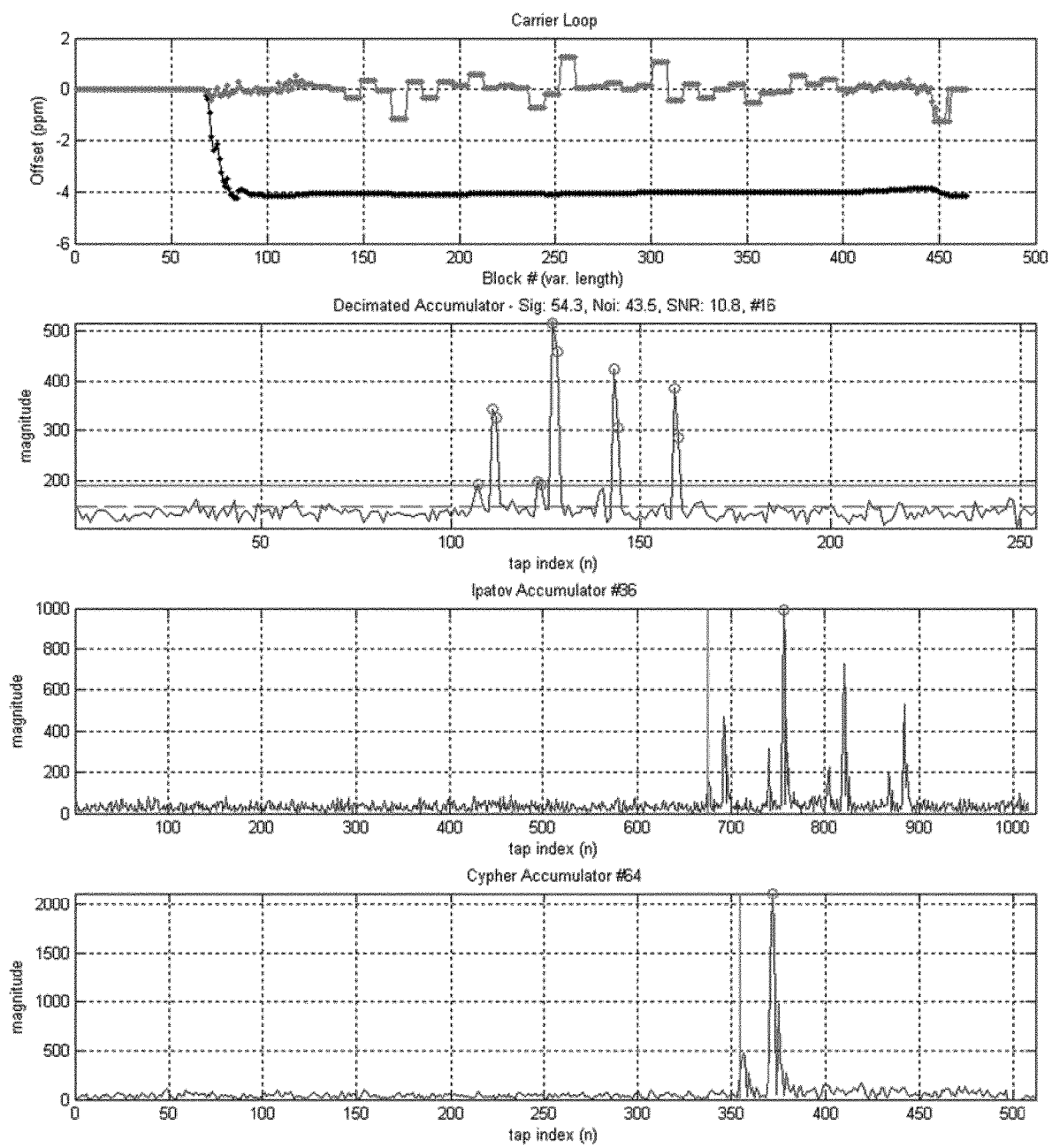
FIG. 15 shows simulation results of four quasi-simultaneous frames with simultaneous DecaCypher in a DW1100 implementation.

FIG. 15 shows the results of a simulation of the DW1100 IC in this situation. In this case, each frame was simulated as being on the air with carrier frequency offsets (CFOs) of −2 ppm, −3 ppm, −4 ppm, and −5 ppm respectively. The frame amplitude was scaled so that the −4 ppm frame was at −89 dBm and the other three frames were at −91 dBm.

The preamble detection algorithm builds a short snapshot of an estimated channel response. This can be seen in the $2^{nd}$ subplot in FIG. 15. The receiver looks for the strongest energy window and adjusts the receiver delay so that it positions this energy and its channel matched filter (CMF) at the 64 ns window between taps 728 and 792 of the accumulator. This portion of the estimated channel response is used to set the coefficients of the channel matched filter. In this particular simulation, the strongest signal seen during preamble detection was the second one to arrive. Once preamble has been detected, the carrier recovery, the timing recovery and the SFD detection use only the energy in the CMF portion of the channel estimate to operate. This causes the estimated carrier offset being tracked in the carrier loop, to converge to −4 ppm as can be seen in the $1^{st}$ subplot of FIG. 15. The accumulator then builds up its channel estimate until the SFD is detected. This can be seen in the $3^{rd}$ subplot of FIG. 15. The second arriving signal appears the strongest for two reasons. Firstly, because the signal is actually 2 dB stronger and secondly, because the other signals' CFOs are not being corrected which causes these other signals to partially cancel.

The SFD of the second arriving signal is detected. Note that any SFDs which arrive earlier will not be seen, because they do not arrive within the window where the CMF is positioned. The span of the CMF is only 64 ns and the four signals are all delayed by at least 64 ns from each other.

Next, the receiver starts decoding the data to receive the data bits in the PHR and then the payload. It uses the CMF, which only gathers energy from the window where the wanted signal is, so that the energy of the data bits of the other frames is not raked in by the CMF. Also, each bit of the PHR and the following data uses a different spreading code in the transmitter and despreading code in the receiver, which further isolates the true data from the unwanted other signals.

Next the receiver gets all four DecaCypher signals from all of the frames at the same time separated by the individual propagation delays. The receiver knows the polarity of each pulse in the sequence of pulses that make up each symbol in the DecaCypher, so it can correlate with the expected pulses and get an estimate of the channel impulse response. Since there are up to four copies of the DecaCypher sequence arriving at the receiver at a similar time, the impulse response estimate will be estimates of all four channels overlaid. In this way, when it uses this to calculate the distance to the car, the first arriving signal it will see, will be the first large enough path of all of these DecaCyphers that arrives.

Figure 16:
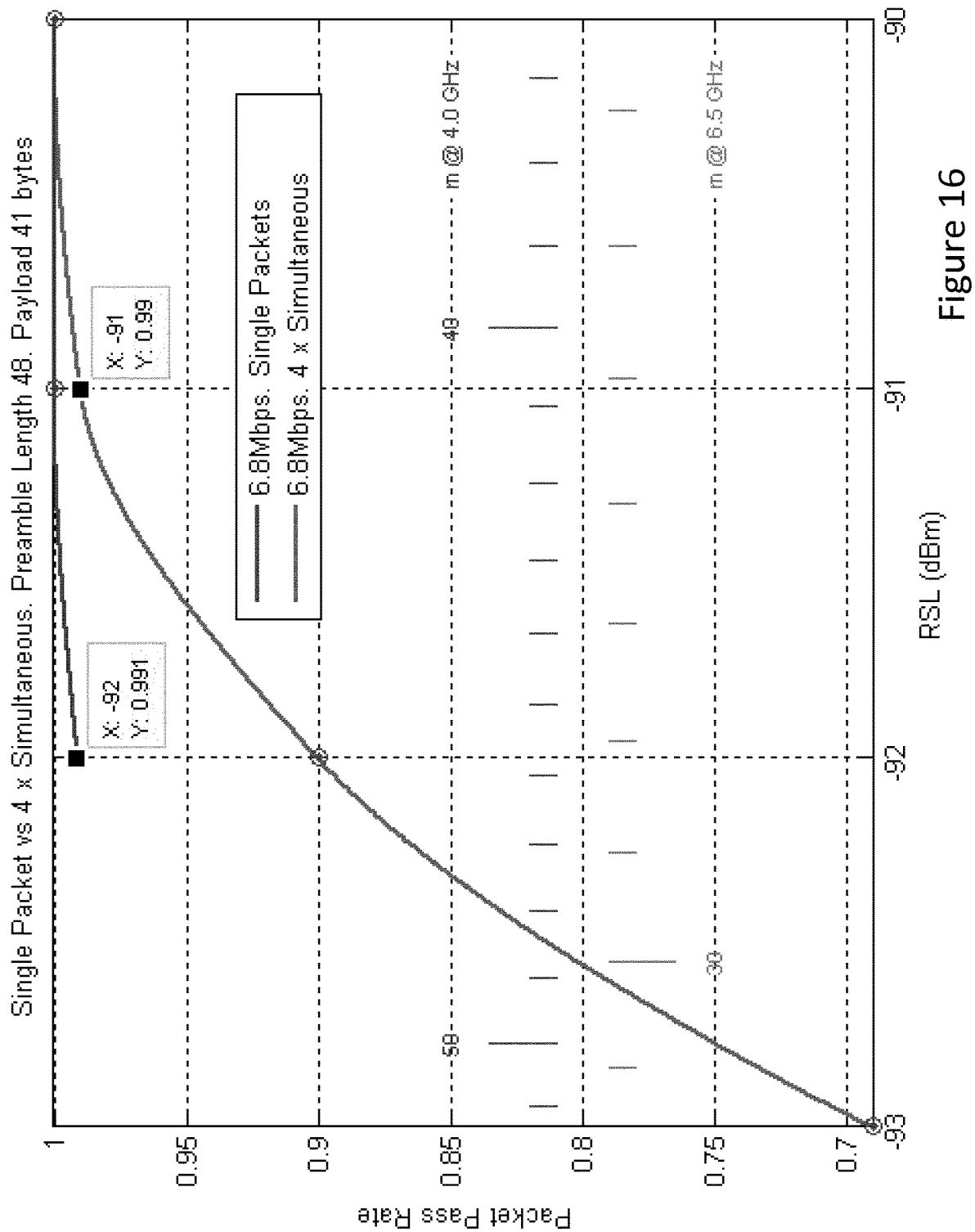
FIG. 16 illustrates a performance comparison for a two-path channel.

FIG. 16 illustrates a performance comparison for single packet vs. four simultaneous packets (2 path channel).

Note that in the above examples, particular delays, silences, Ipatov lengths and payload sizes are used. There are many other delays that can be used to balance, or approximately balance, the silence with the frame lengths to achieve the same effect. There are many other CMF lengths than 64 ns that could be used. Symbol lengths can vary from 1 μs, without changing the underlying ideas. Also, the above examples are for the 6.8 Mbps mode described in IEEE802.15.4-2011. There are other bit-rates that could be used, requiring different numbers to balance the delays, also there are other wireless implementations, including IEEE802.15.4f, IEEE802.15.6, IEEE802.15.8 and many others, which would benefit from the techniques described here.

Simulranging-Based Localization

Localization via triangulation methods is also possible with simulranging packets. To triangulate, distances from two or more anchors to the keyfob are obtained. Since all cypher transmissions are aligned, it is generally not possible to separate various anchor paths in the cyphered accumulator. However, it is possible to calculate different distances based on sections of the Ipatov accumulator.

To do this, pulse sequences from anchors are shifted, for example by 128 ns, so that they occupy different segments in the Ipatov accumulator.

Figure 17:
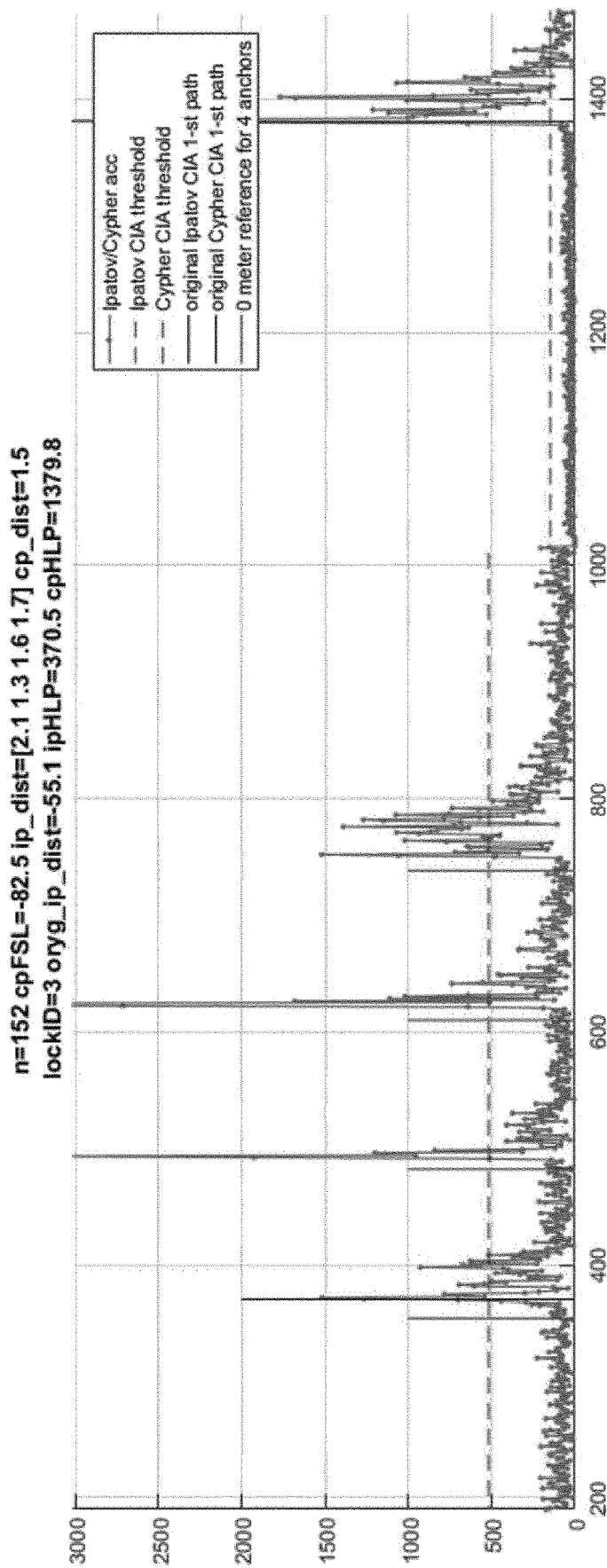
FIG. 17 illustrates localization in attenuated NLOS conditions.

An example of using this shifting technique in a challenging NLOS (non-line-of-sight), scenario (e.g. key fob in back pocket) with 4 anchors hidden behind a body is shown in the accumulator plot in FIG. 17. The first 1016 accumulator samples are the accumulator from the Ipatov preamble. The next 512 samples are the accumulator from the cyphered preamble (DecaCypher). Hypothetical Ipatov sample indexes corresponding to 0-meter distance are computed for each anchor (vertical red lines). The distance from these lines to the first path determines distance of each anchor—in this example, 2.1 m, 1.3 m, 1.6 m, 1.7 m—which are close to the actual distances. The cypher-based distance was calculated as 1.5 m therefore in the triangulation process, for security reasons, shortest Ipatov-based distance is increased from 1.3 to 1.5 m.

Figure 18:
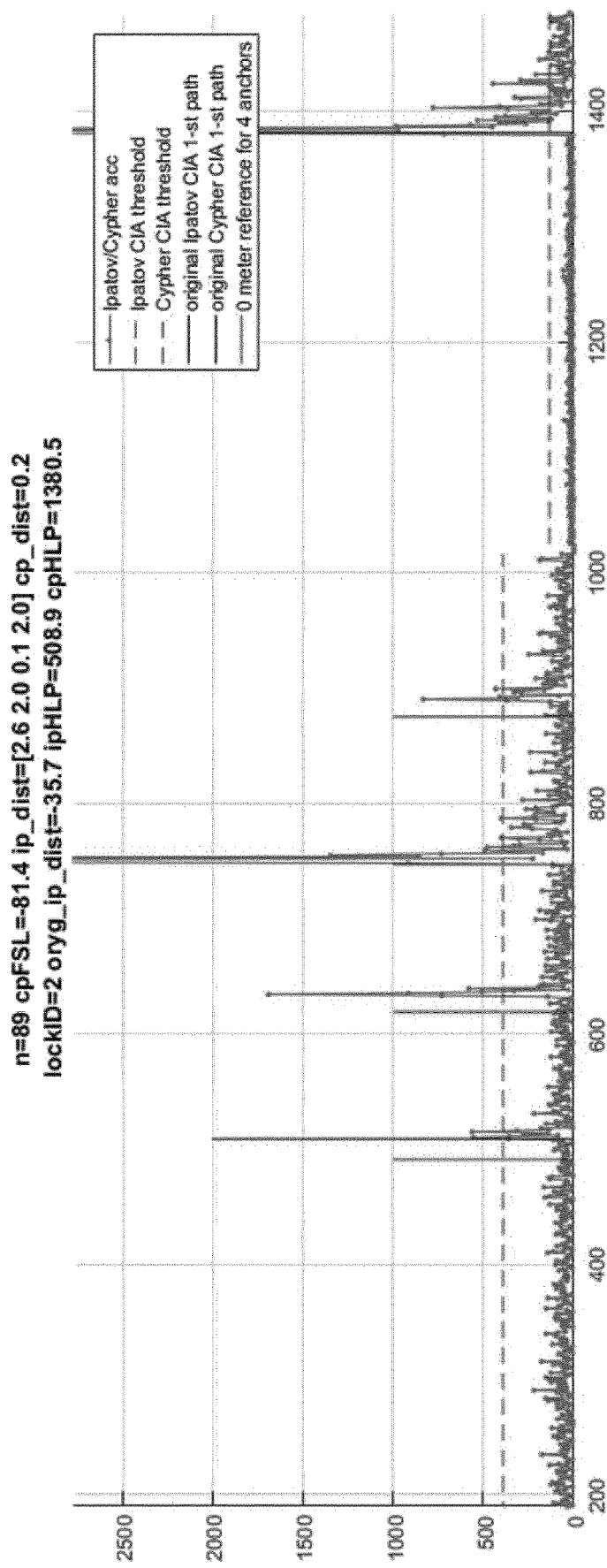
FIG. 18 illustrates localization in LOS conditions.

In LOS (line-of-sight) conditions, the paths are stronger and sharper, except when one anchor is at extremely close distance and blasting with huge power. In FIG. 18, anchor #3 is at 0.1 m distance which reduces amplitude of other LOS paths at 2.0-2.6 meters.

Figure 19:
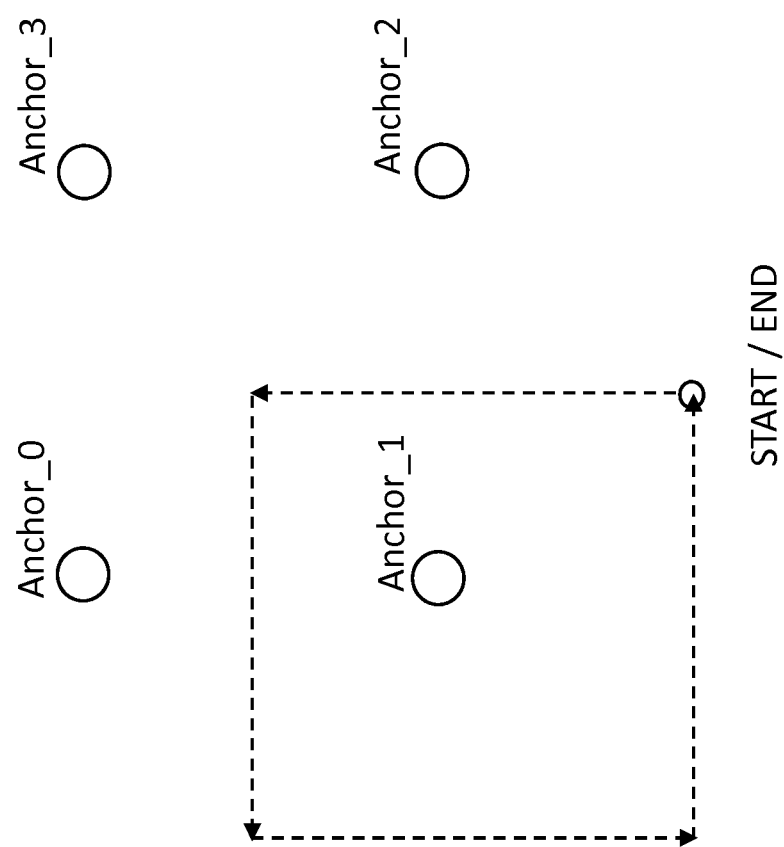
FIG. 19 illustrates a 4-anchor walk-around test.

Walk-around test results are presented below. Four dots representing 4 anchors were placed in a square approx. 1.9 m from each other as illustrated in FIG. 19. The walking route is shown.

Figure 20:
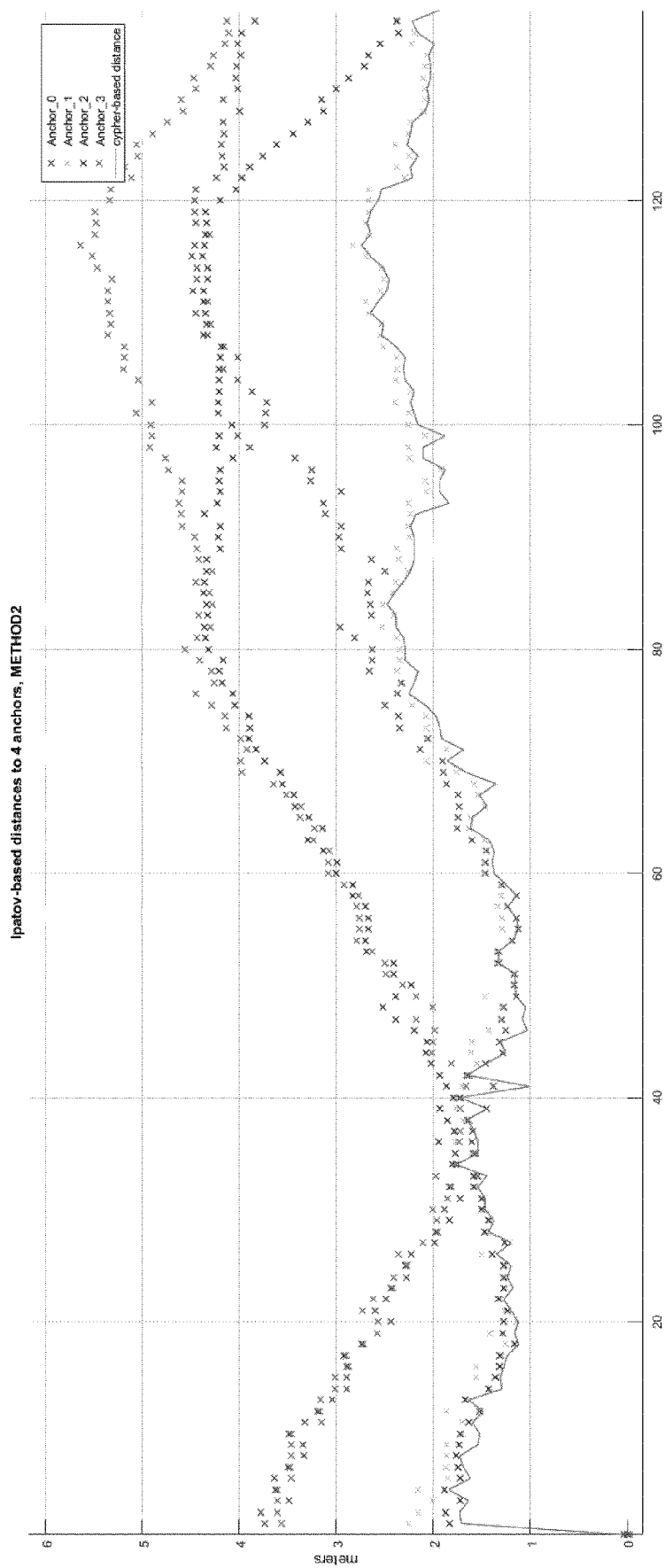
FIG. 20 illustrates distance measurements for the 4-anchor walk-around localization test.

Determined distances to all 4 anchors (based on individual Ipatov preambles) are presented in FIG. 20, together with cypher distance (i.e. the distance determined based on the simultaneous DecaCypher training sequence).

Simulranging Packet Structure Optimizations

Compared to the baseline proposal shown above, many optimization approaches are possible:

1. Reduce Ipatov pulses timing offset. The timing offset may be reduced from 128 ns to 96 ns or even 64 ns. That should be still sufficient to prevent multipath overlapping CMF window of another path. The consequence would be reduced differences between payload sizes. In PRF64 mode, instead of payloads differing by 16 octets (resulting in 128 ns timing offset), they could differ by 8 (64 ns offset). That would help reduce overall packet size.
2. Reduce data packet size. If the minimum data packet block can be, for example, 4 octets instead of 16, then ALL payload sizes could be reduced by 12 octets (12 μs). It is also possible to send PHR without any data octets (0 size) if data payload is not needed; in that case, payload sizes could be 0, 16, 32, 48 octets for four anchors.
3. Reduce TX power/mute. Since the keyfob only needs to lock on to and decode a payload from one anchor, the other anchor Ipatov/payloads can be delayed and muted (or transmitted at lower power). This way, total TX power budget can be optimized and the power of selected sequences can be increased. In the case of packet structures, where only certain anchors send a valid payload (MASTER anchors), one of the remaining anchors (SLAVE), can operate in an alternative cypher mode where the payload is transmitted after the cypher (thus reducing the overall packet length).
4. Pre-selection. If another physical communication layer (like LF), or based on previous UWB packet transmissions, the system can do anchor pre-selection of, for example, the 2 best anchors with the strongest signal, 2-anchor variants would be possible, significantly reducing packet length increase compared to 4-anchor variants. Alternatively, the 2 best pre-selected anchors can send Ipatov preambles with DATA, while the remaining can transmit only a cyphered preamble (with a muted Ipatov preamble, SFD, PHR/DATA)—See FIG. 22.

5. Add silence gap to avoid locking on to shortest Ipatov preamble. In order to improve the Ipatov accumulator quality (for example, for localization purposes), it would be best to allow it to accumulate for longer than the shortest Ipatov length. To prevent locking in on the shortest Ipatov (and stopping accumulation after $1^{st}$ SFD), the shortest accumulators can be preceded by at least 8 symbols-long silence. This will cause the keyfob to lock on to the earlier arriving Ipatov preambles. To improve the quality of the channel estimate from the shorter Ipatov anchors, their Ipatov TX powers could be increased at the expense of the data payload (which will not be decoded anyway). See FIG. 21.

6. Using mixed cypher protocols. Using cypher protocol 1, where the cypher is sent immediately after the SFD, on certain anchors (there will be no 1024 ns symbols before cypher) and certain anchors with payload size 0 (only PHR) which has 21 1024 ns symbols before the cypher. Since the receiver is configured for either mode 1 or mode 2, anchors operating in a different mode should be SLAVE anchors (i.e. the receiver will not lock on to them). See FIG. 22.

7. Using cypher-gap. In cases of anchors in SLAVE mode (the keyfob will never lock on to them), one can use a configurable transmission gap before the cypher preamble instead of a long payload or long Ipatov. This allows transmission power to be saved and the power budget can be used to boost the power of other sequences.

Figure 26:
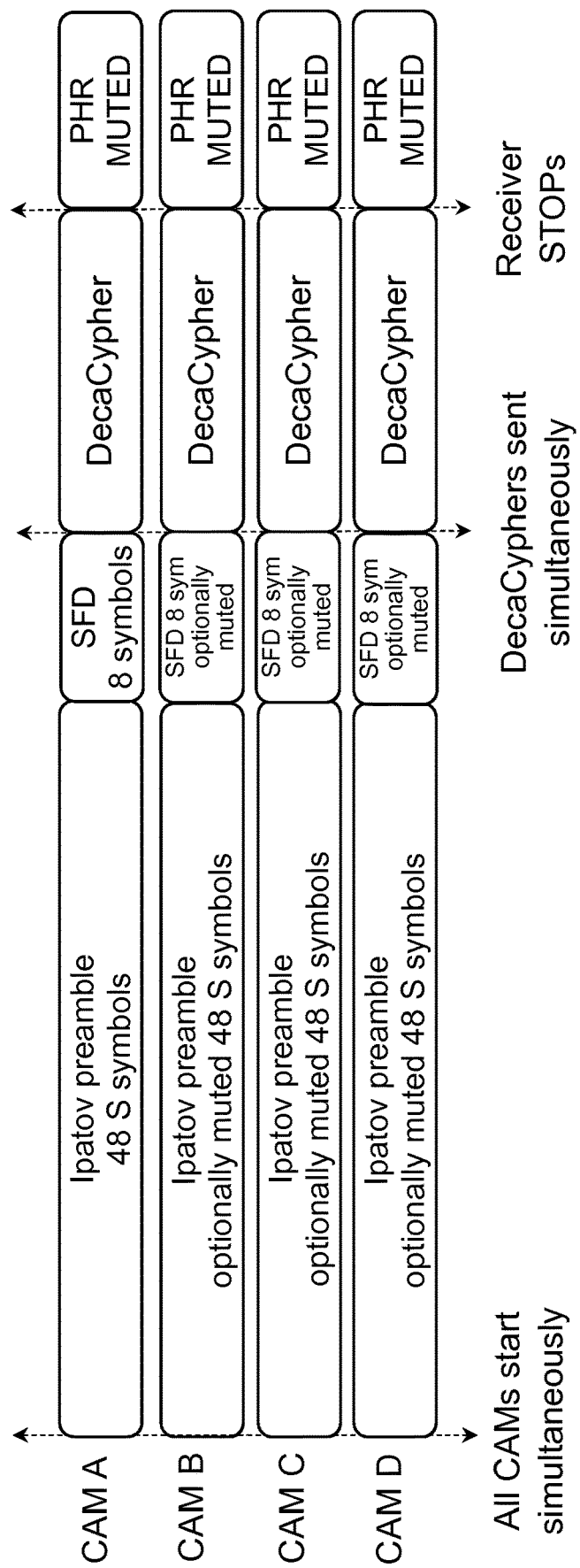
FIG. 26 illustrates parallel simulranging without data payload (123 µs frame duration)

8. Early RF shut-down. The RF receiver and/or transmitter can be shut down immediately after receiving/transmitting the cypher, not waiting for PHR/DATA. This will allow for further packet length reduction by at least 21-28 μs (FIG. 26).

9. Parallel packets without timing offset. With crystals trimmed and all anchors having the same CFO, and with identical data payload (or no data payload at all) it is possible to transmit completely in parallel without any timing offsets. Additional anchors would then look like multipath. Certain anchor messages can have optionally muted Ipatov/SFD preambles to allow for a TX PWR increase of active sequences.

10. Shortening the Ipatov preamble. With CFO known to the keyfob and with a strong signal coming from multiple anchors, it should be possible to shorten the Ipatov preamble.

And several PRF16-based optimizations:

11. Using PRF16 mode. Ipatov symbol length is 992 ns allowing a reduction in the length difference between the payloads of anchors from 16 to just 4 octets. That will allow for shortening of packet lengths or extending effective preamble lengths (at the same packet size) for better localization performance.

12. A mixed mode, using PRF16 Ipatov with PRF64 cypher is also possible. It would optimize payload sizes while providing best cypher quality. PRF16 Ipatov has better sensitivity than PRF64 Ipatov because all Ipatov sequences in PRF16 have nearly the same length. For example, length-88 PRF16 may perform better that 48-length PRF64—and both would have the same packet size. In the cyphered preamble, symbol count is the same irrespective of PRF and PRF64 performs better.

There is huge number of legal combinations, which should work and result in aligned cypher preambles. Depending on scenario and requirements, a user can apply the presented ideas selectively, to optimize packet structures. Several scenarios are presented in examples below.

PRF64 Variants Supporting Localization

Localization requires that all Ipatov sequences be shifted by a known timing shift (for example 128 ns) apart. This timing shift can be implemented by increasing the number of data symbols (each 1024 ns long) or enabling/disabling the PHR (which consists also of 1024 ns symbols).

The following examples implement optimization ideas set out in the previous section.

Referring back to the default structure shown in FIG. 12, the packet length for that arrangement is:

$$384+96*1016+8*1016+21*1024+1024*22+\\65536=215616\ ns=216\ \mu s$$

One weakness of the default structure is that locking to CAM_A with the shortest Ipatov preamble will stop the accumulation process after 40-48 symbols. That will degrade the quality of Ipatov peaks.

In a proposed alternative, due to CAM NB starting delay, the keyfob will lock to either anchor C or D, but paths from A and B will be present in the Ipatov accumulator. Accumulation will now take 80 or 96 symbols, maximizing anchor C/D energy in the Ipatov accumulator. Since the keyfob will not lock to A or B, their payloads can be transmitted using minimal power. CAM A and B can use their TX power budget to instead transmit their Ipatov preambles at a higher TX power to compensate for their shorter length. While this alternative has the same length as the default one (216 μs), it should have much better Ipatov peak quality for more accurate localization.

If a data payload is not needed, it is possible to reduce the packet lengths (shortening all payloads by 22 symbols).

Figure 21:
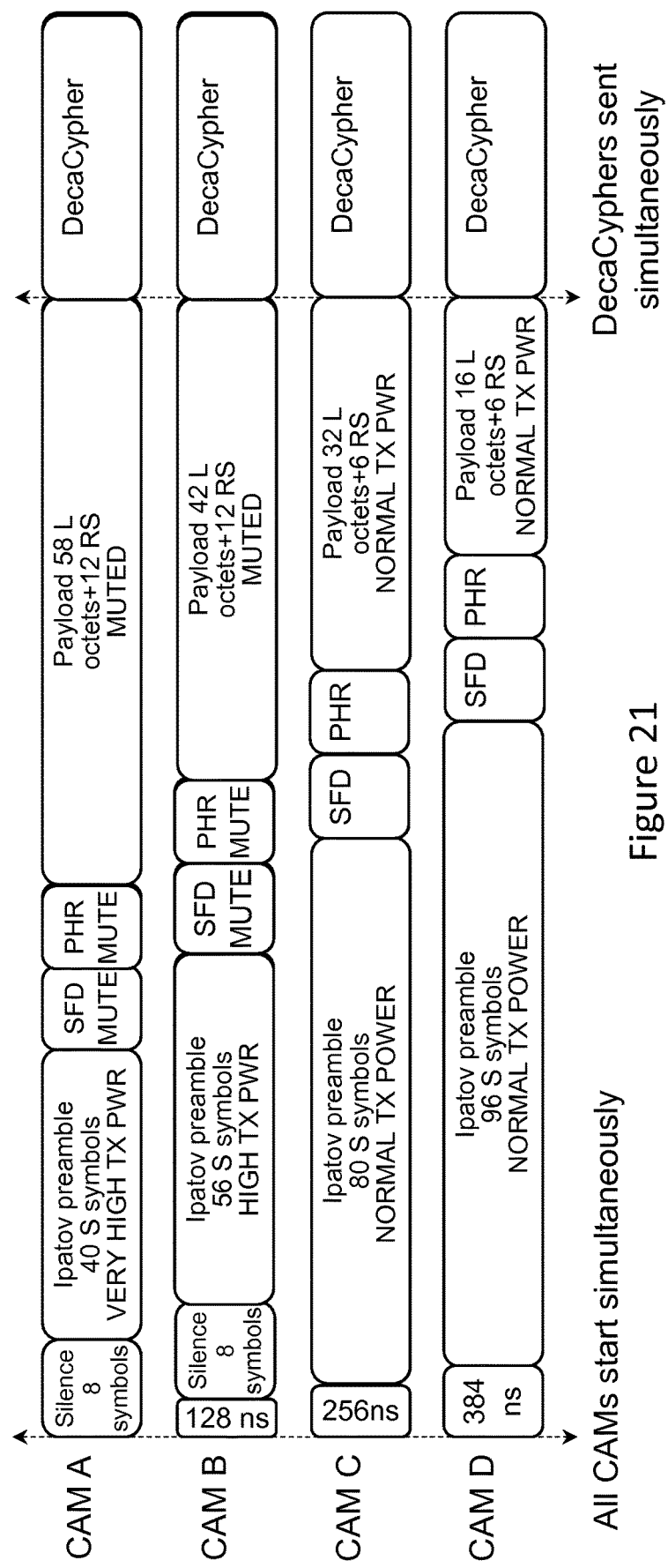
FIG. 21 illustrates a PRF64 frame structure example (216 µs duration)

FIG. 21 illustrates a PRF64 frame structure example (216 μs).

Figure 22:
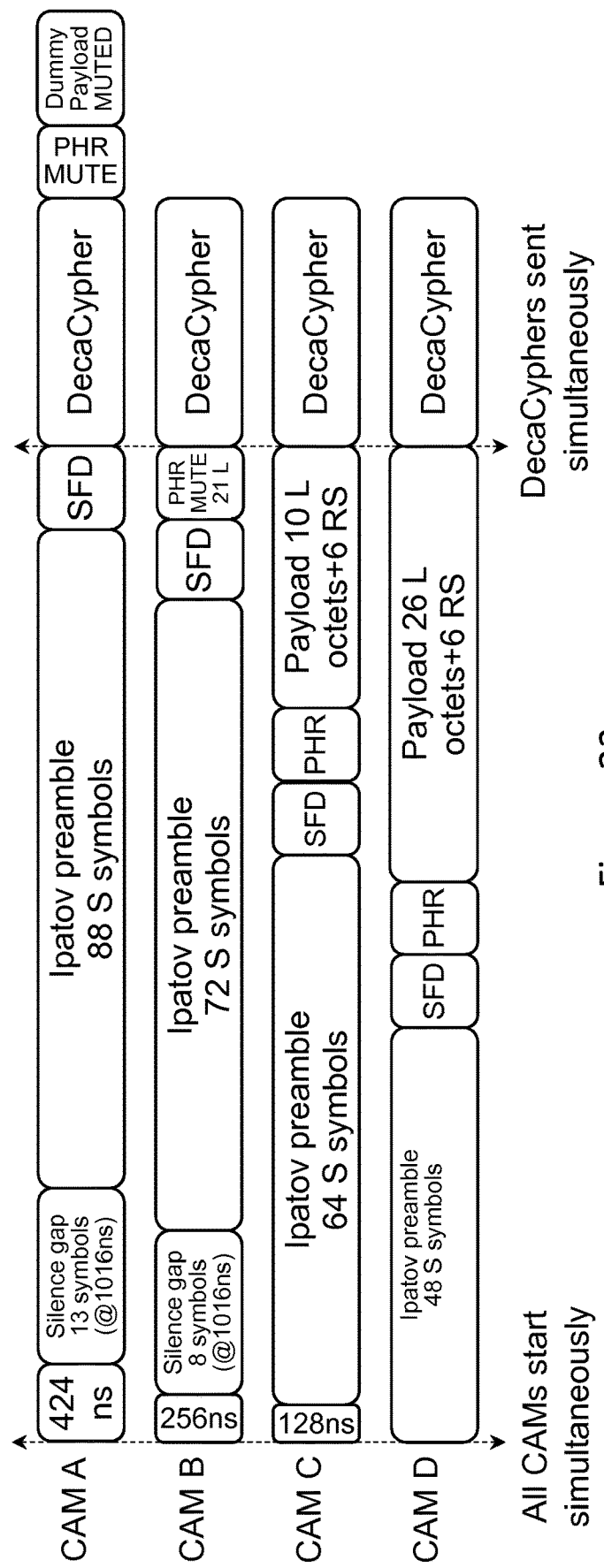
FIG. 22 illustrates a PRF64 frame structure for use in localization with optional frame portions (177 µs frame duration)

FIG. 22 presents a shorter alternative, where the packet length from the start till the end of DecaCypher is just: $424+13*1016+88*1016+8*1016+65536=176704$ ns=177 μs. This is achieved by setting up the $1^{st}$ anchor with PHR/DATA after the cypher and the $2^{nd}$ just with a PHR. Using only PHR without DATA (21 symbols*1024 ns) shifts Ipatov pulse grid by 21*8 ns=168 ns which is more than sufficient.

Placing >8 symbols of silence before Ipatov will result in the keyfob not locking to the anchor. A possible weakness of this scheme is again locking in to shorter Ipatov sequences (CAM_C or CAM_D) and generally shorter accumulation lengths.

RF64 Variants without Localization but with Anchor-Specific Data Requirement

Figure 23:
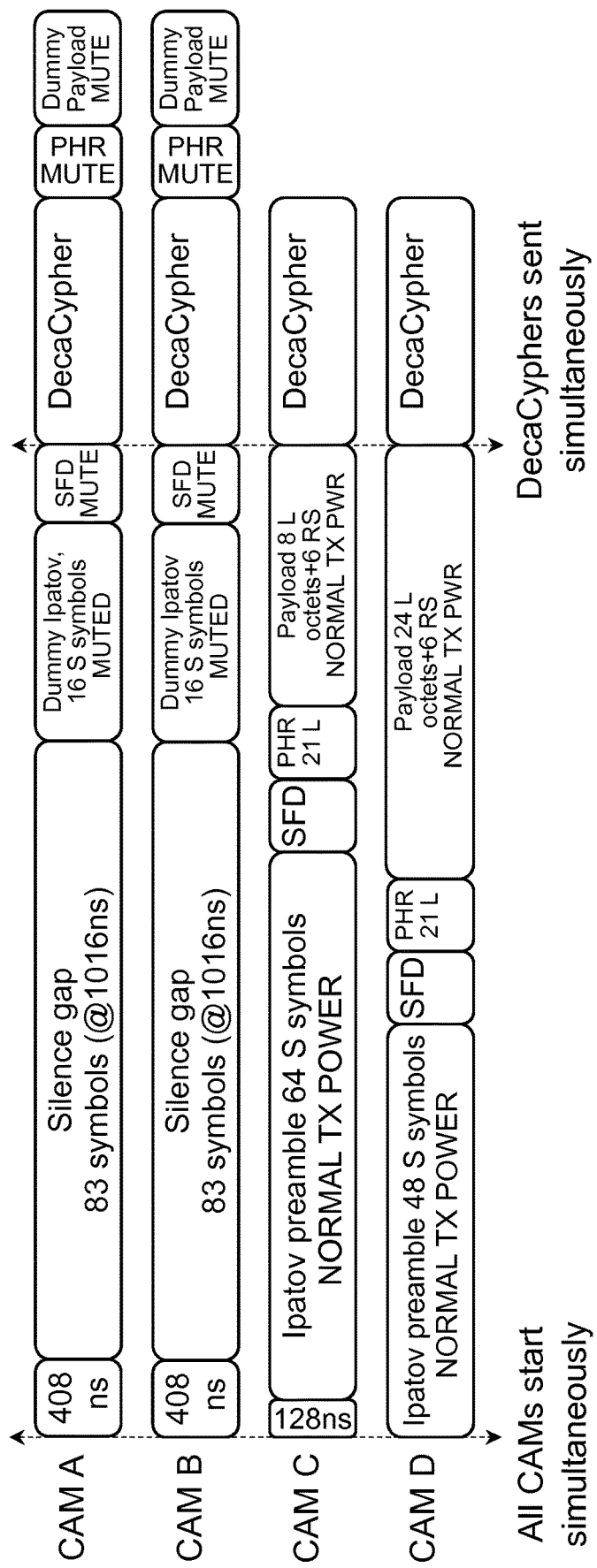
FIG. 23 illustrates a PRF64 frame structure with two valid Ipatov preambles and payloads (175 µs frame duration)

In many cases where localisation is not required, especially with anchor pre-selection, there is no need to transmit 4 payloads or 4 Ipatov sequences and a reduced number of valid Ipatov/payload messages can be sent. In the example shown in FIG. 23, only CAM C and CAM D transmit valid Ipatov preambles and payloads. The keyfob will lock on to one of these, while still receiving the cyphered preamble from all 4 anchors. Not transmitting a valid data payload on some anchors allows for overall multi-packet length reduction. In the example here, the packet length (till the end of the cypher) is:

$$0+48*1016+8*1016+21*1024+30*1024+\\65536=174656=175\ \mu s$$

CAM A and B are mostly muted except for the cypher preamble (DecaCypher), so they could alternatively be programmed in the same way as CAM_C/D but with Ipatov/SFD/PHR/DATA muted.

Figure 24:
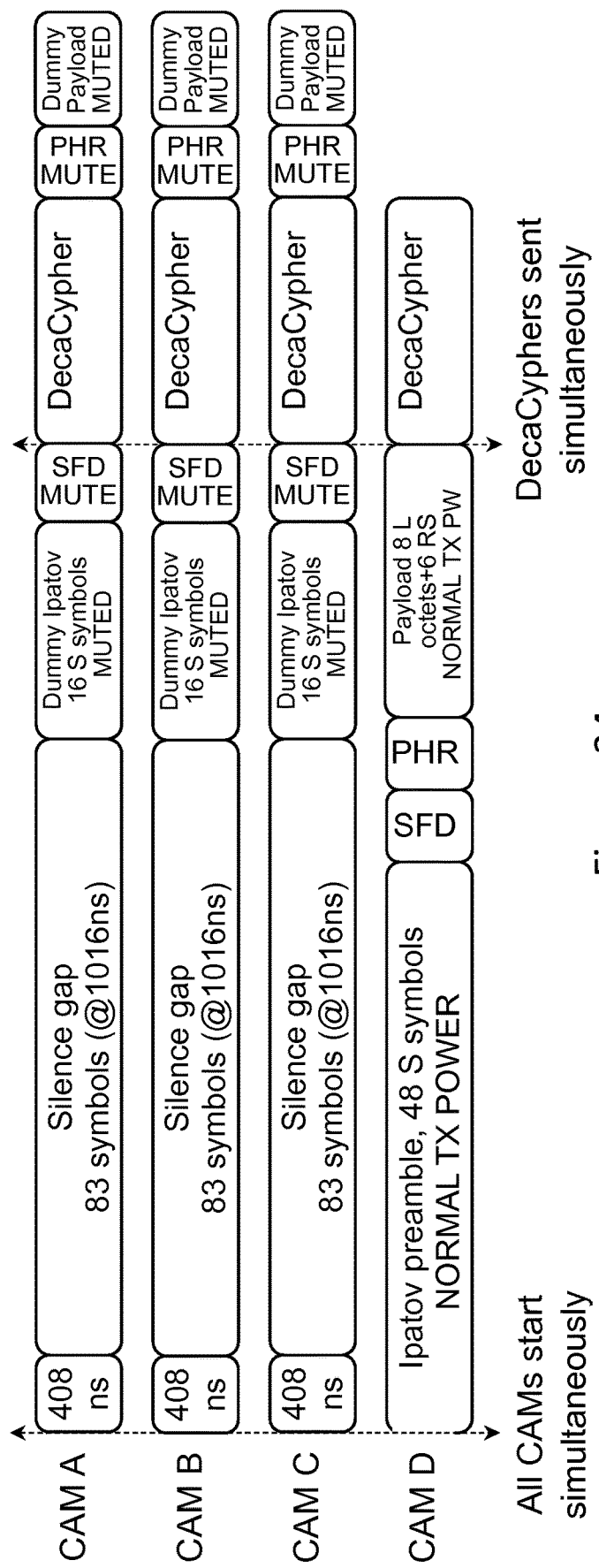
FIG. 24 illustrates PRF64 packets (with 158 µs frame duration)

If a single anchor is deemed sufficient (to receive the payload from), then CAM C could be setup identically as CAM NB with only CAM D transmitting valid payload and Ipatov. This would shorten the packet even further, as illustrated in FIG. 24:

Length:48*1016+8*1016+21*1024+14*1024+65536=158272 $ns$=158 μs.

Variants without Localization Support and with Identical Data on all Anchors.

Figure 25:
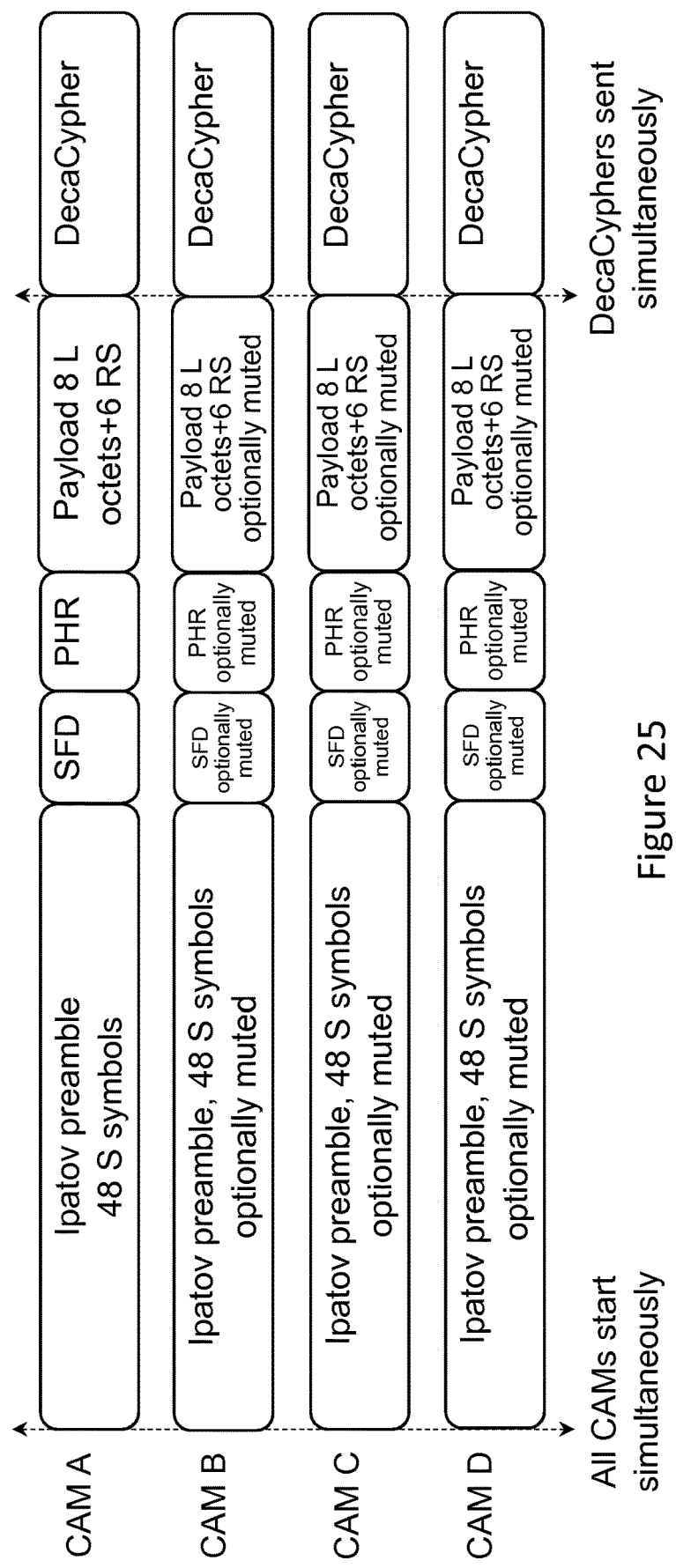
FIG. 25 illustrates a PRF64 scheme with identical data transmitted (163 µs frame duration)

With accurate crystal trimming on all anchors, it would be possible to transmit from all anchors at the same time without timing shifts (64,128 ns etc). Such transmissions would be seen by the keyfob as additional paths in a multipath profile. Because all paths would end up in the same CMF window (64 ns wide), all transmissions need to have identical data and very closely matched CFO. Therefore, if there is no requirement to transmit anchor-specific data (e.g. anchor ID), or if there is no requirement to transmit any data at all, the scheme depicted in FIG. 25 could be used.

Additional anchors can either be muted during Ipatov/SFD preamble or transmitting. The scheme could be implemented with any number of anchors. Due to potentially better Ipatov signal quality received by the keyfob, and due to controlled CFO (which is known a priori to the keyfob), it could be possible to shorten the Ipatov sequence.

Variants without Localization Support and without Data Requirement

If no data is required, each anchor can be configured with PHR/DATA (0 size) to be transmitted after the DecaCypher field and with its TX PWR muted. The receiver in the keyfob can therefore shut off its RF immediately after the cypher (similarly the transmitter can shut down its RF after the cypher). This technique was discussed above. An example is shown in FIG. 26. With a 48-symbol Ipatov, the total sequence length is 123 μs (excluding the unused PHR), but can be shortened further if a shorter Ipatov preamble can be used (as discussed previously).

PRF16 Ipatov Variants Supporting Localization

In PRF16, the Ipatov/SFD symbol length is 992 ns, 32 ns shorter than payload symbol length. This makes scheduling of the packets more optimal because payload sizes can now differ by only 4 octets (4 symbols times 32 ns difference gives 128 ns timing shift between packet pulses during Ipatov).

Figure 27:
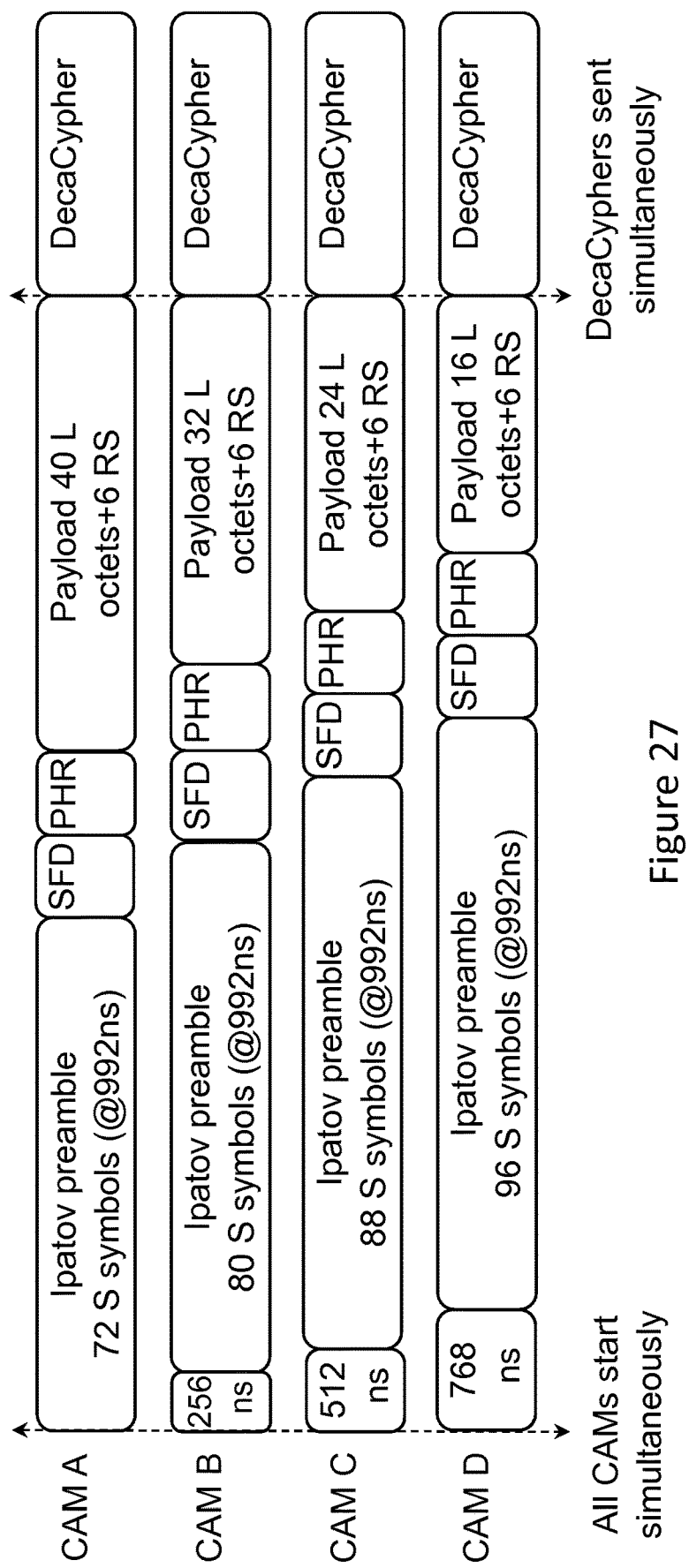
FIG. 27 illustrates a basic PRF16 variant.

FIG. 27 presents an example PRF16 structure. Note that all payloads can be decreased by the same number of octets (for example to 4, 12, 20, 28 octets) and the Ipatov preamble can be reduced to, for example, 48 symbols (CAM_A), 56 (CAM_B), 64 (CAM_C), 72 (CAM_D).

Figure 28:
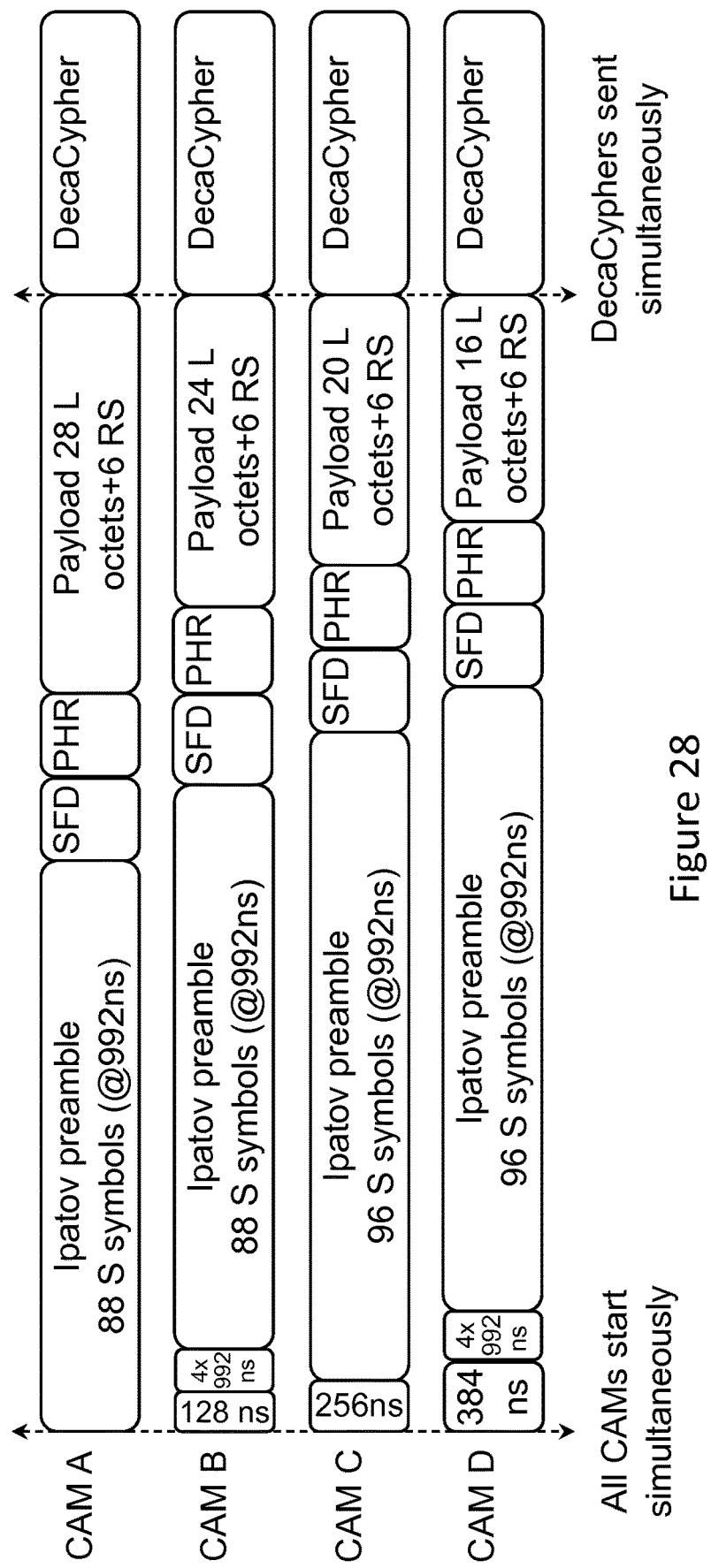
FIG. 28 illustrates a PRF16 variant with smaller payload differences and longer Ipatov sequences.

Further optimization can be done reducing payload length differences to 4 octets. In this scheme, adding 4×992 ns silence to CAM_B and CAM_D allows only two Ipatov lengths to be used. And as in previous example, payloads could be reduced to 4, 8, 12, 16 octets and Ipatov sequences to 48 symbols (CAM_A and CAM_B) and 56 symbols (CAM_C and CAM_D). An example is illustrated in FIG. 28, showing a PRF16 structure with smaller payload differences and longer Ipatov sequences.

Packet-Length Optimized 2-Anchor Variants (with and without Data)

Figure 29:
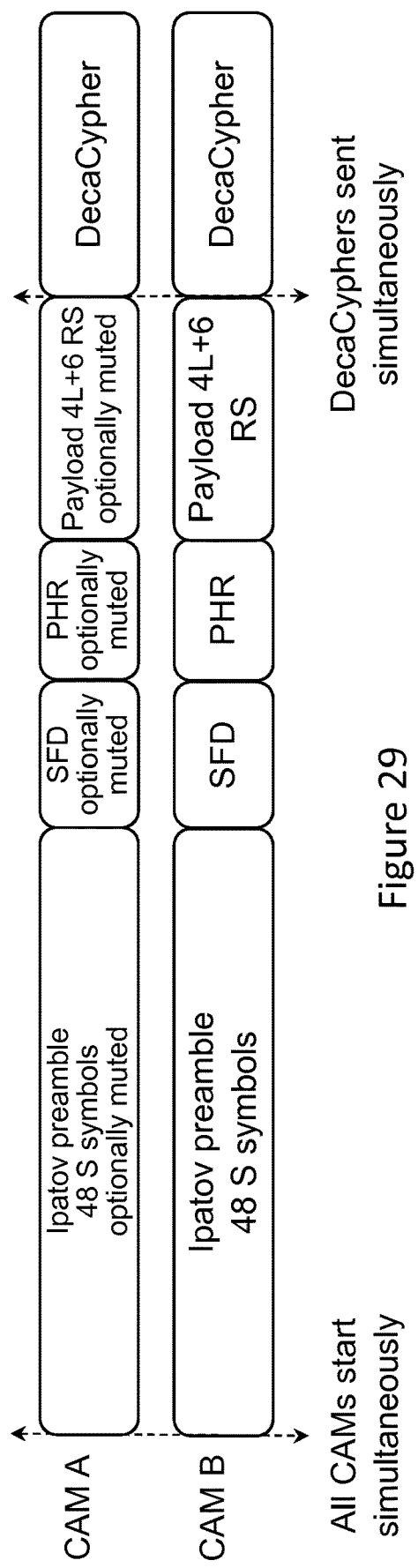
FIG. 29 illustrates a 2-anchor variant of the communication scheme (158 µs frame duration)

2-anchor variants can be derived from the previously described 4-anchor variants. An example (158 μs) with a small payload is shown in FIG. 29. The Ipatov preamble and data payload can be transmitted on one or both anchors. If data is transmitted on both, it should be identical.

Figure 30:
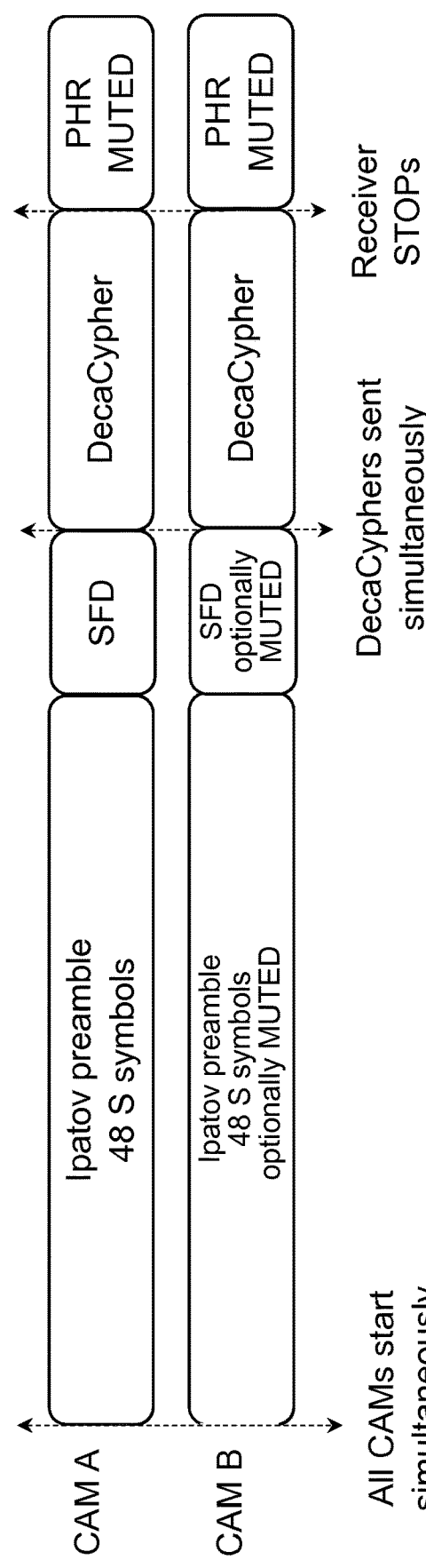
FIG. 30 shows an ultra-short 2-anchor variant of the scheme, with (optionally) muted SLAVE CAM_B preambles.

If no payload is needed, it is possible to move the PHR/DATA after the cyphered preamble. This is illustrated in FIG. 30. CAM_B Ipatov/SFD can be either muted or transmitted at lower power, the PHR/DATA is always muted. This provides an ultra-short 123 μs packet (or shorter if Ipatov can be shortened), assuming transmitter/receiver RF is shut down (as explained in a previous section) after the DecaCypher sequence:

Advantages of these variants may include:
ultra short packet size for lowest possible power consumption.
since TX PWR limit is calculated per 1000 μs, we can increase baseline TX PWR 1000/123=8.13 times, that is by 9.1 dB (assuming 123 μs length)
Optionally SLAVE CAM_B can only transmit Cypher (64 μs). Approx. 50% TX PWR saved by SLAVE can be transferred to boost overall TX PWR budget.

If SLAVE CAM_B is not transmitting an Ipatov preamble, there is a possibility that CAM_A will not be locked on to. However, this risk should be reduced due to:
pre-selection of the best anchor
extra TX PWR available.
no interference from SLAVE anchor
If the response fails, the car can restart the process with swapped anchors.

Example Scenario

Figure 31:
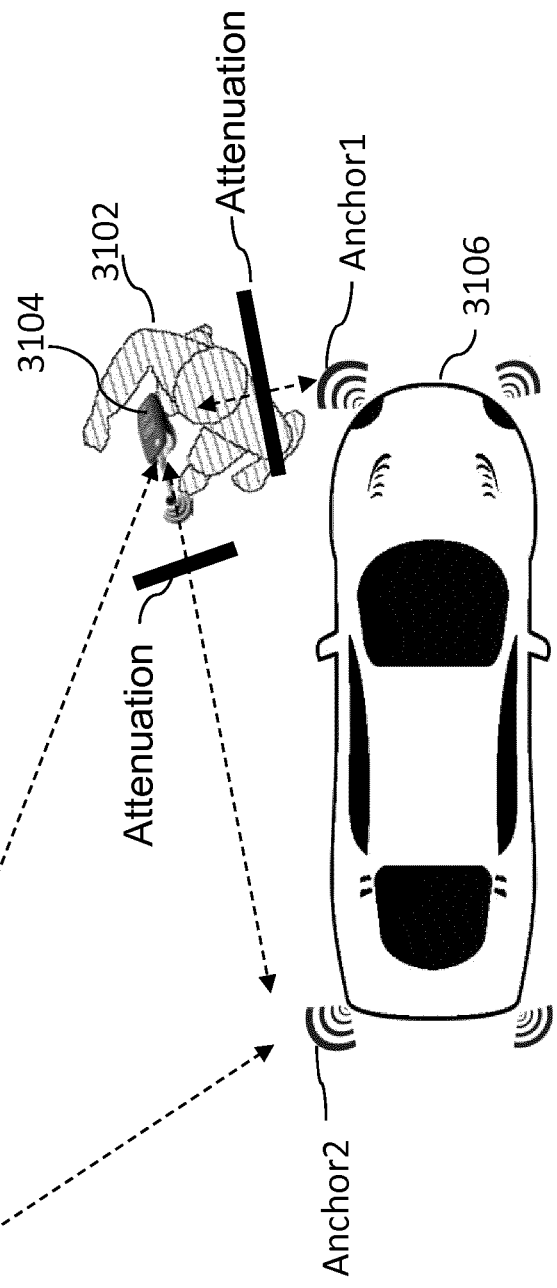
FIG. 31 illustrates an example scenario of transmission/reception between a vehicle and key fob.

An example scenario is illustrated in FIG. 31, showing the user 3102 with keyfob 3104 facing away from the vehicle 3106. The vehicle includes multiple anchors as previously described. Anchor1 has a weak first path (due to the user's intervening body). Anchor2 has a weak first path but strong multipath due to a reflector 3112 (attenuation e.g. due to path obstruction is shown as thick black bars across the signal paths).

The following happens in this scenario. Both Anchor1 and Anchor2 see the fob's packet and respond. The fob 3104 latches onto Anchor2 because of the strong multipath and sees Anchor2's SFD and data. The time of arrival at Anchor2, $ToA_2$, is communicated back to fob in the data packet. DecaCyphers arrive at approximately the same time, but Anchor1's cypher arrives slightly earlier because (a) it receives the fob's initiation packet slightly earlier and (b) Anchor1's cypher has less distance to travel. This results in a first path being present in the fob's CIR estimate coming from Anchor1 slightly earlier than the FP from Anchor1. The CIR estimate will look approximately as illustrated in FIG. 32.

The time of arrival of the packet from the fob at Anchor2, $ToA_2$, will be the time of sending of the fob packet, ToS, plus the time of flight from the fob to Anchor2, $Tp_{A2}$.

$ToA_2=ToS+Tp_{A2}$

Similarly $ToA_1=ToS+Tp_{A1}$

The Anchor will then respond after waiting for a known response delay time (Tdel). The transmission and response are illustrated in FIG. 33.

The time of arrival at the fob of the first path from Anchor2, $Tfp_2$, will be:

$Tfp_2=ToA_2+Tdel_2+Tp_{A2}$

Where $Tdel_2$ is the time delay implemented in Anchor 2. This is a pre-agreed delay, but is counted with Anchor2's clock which is not generally an ideally accurate clock, but is offset by a small fraction, $\varepsilon_2$, generally of the order of 0-20 ppm or $0\text{-}20\times10^{-6}$.

$$Tdel_2 = (Tdel + \delta_2)(1 + \varepsilon_2) \approx Tdel(1 + \varepsilon_2) + \delta_2$$

A small amount of time, $\delta_2$, will be added because the transmitter only has a finite amount of control over the exact response time Similarly, The time of arrival at the fob of the first path from Anchor1, $Tfp_1$, will be:

$$Tfp_1 = ToA_1 + Tdel_1 + Tp_{A1}$$

Substituting for $ToA_1$:

$$Tfp_1 = ToS + Tp_{A1} + Tdel_1 + Tp_{A1}$$

Where $Tdel_1 = (Tdel + \delta_1)(1 + \varepsilon_1) \approx Tdel(1 + \varepsilon_1)$; the time delay implemented in Anchor 1.

The fob measures the CFO of the packet from Anchor 2 and then calculates the time of flight by subtracting the ToS and, because the message came from Anchor2, $Tdel_2$, as:

$$Tp_{2\_est} = (Tfp_1 - ToS - Tdel_2)/2$$

Substitute for $Tfp_1$:

$$= (ToS + ToF_{A1} + Tdel_1 + Tp_{A1} - ToS - Tdel_2)/2$$

Substitute for $Tdel_1$ and $Tdel_2$:

$$= (ToS + ToF_{A1} + Tdel + \varepsilon_1 Tdel +$$
$$\delta_1 + Tp_{A1} - ToS - Tdel - \varepsilon_2 Tdel - \delta_2)/2$$
$$= (2Tp_{A1} + \varepsilon_1 Tdel + \delta_1 - \varepsilon_2 Tdel - \delta_2)/2$$
$$Tp_{2\_est} = Tp_{A1} + Tdel(\varepsilon_1 - \varepsilon_2)/2 + (\delta_1 - \delta_2)/2$$

In the Decawave DW series ICs the transmitter can only send packets on an 8 ns boundary, this means that $\delta_1$ and $\delta_2$ can take any value from 0 to 8 ns so $(\delta_1 - \delta_2)/2$ can vary from $-4$ ns to 4 ns. Note that if this error is positive so that it causes the path to move further away, the farthest it can move is to the position of $Tfp_2$. As a result a nearer anchor can never seem further away than a farther anchor.

Tdel, is the time interval between receiving the SFD marker and sending an SFD marker. The turnaround time needs to allow the receiver to read the received packet and insert the new send time in the transmit packet so if 135 μs is allowed for this plus and the length of the packet itself is 165 μs, then Tdel will be about 300 μs.

If the grid shifting method discussed above is implemented (adjusting transmission time from fixed 8 ns grid by fine control of the clock frequency), then the transmitter can start transmission at any time it desires, i.e. making $\delta_1=0$, $\delta_2=0$. In this case, the final equation will reduce to:

$$Tp_{2\_est} = Tp_{A1} + Tdel(\varepsilon_1 - \varepsilon_2)/2$$

If the CAMs all use almost identical clock offsets then $\varepsilon_1 = \varepsilon_2$ $$Tp_{2\_est} \approx Tp_{A1}$$

So even though we received the packet from Anchor 2, we get the time of flight to Anchor 1, which is what we want.

How CFO Affects the Amplitude of a Path.

The larger the CFO difference in the two packets, the lower the accumulated amplitude of the path. The accumulator holds the sum of a rotating first path, i.e. the sum of an exponential rotating at the carrier offset frequency. For some offsets, the path will rotate exactly one cycle over the course of the preamble. In this instance, all of the components will sum to zero. Approximating this sum by an integral we have:

$$\int_0^T e^{j\omega t} e^{j\phi} dt = -je^{j\phi} \frac{e^{j\omega T} - 1}{\omega}$$

Where ω if the carrier offset frequency, T is the length of the cypher and φ is the initial phase offset. For a length 64 cypher in channel 5 (6.5 GHz) that will appear as depicted in FIG. 34, showing a plot of path amplitude vs CFO. Notice that the magnitude is independent of the starting phase.

A zoomed path amplitude vs CFO in channel 5 is illustrated in FIG. 35.

Up to about ±1 ppm there is less than 3 dB attenuation and beyond ±6.3 ppm the attenuation is more than 20 dB.

For channel 2 (4 GHz) the response is wider, as shown in FIG. 36 (path amplitude vs CFO in channel 2). For channel 9 (8 GHz), the response is narrower as shown in FIG. 37 (Path amplitude vs CFO in channel 9).

The DW1100 has the ability to adjust its clock with an accuracy of about 0.5 ppm. In order that all the first paths are visible when using simultaneous responses in channel 5, it is preferred that all the anchors' clocks are adjusted to be about 2 ppm lower than the key fob's frequency. This will ensure the paths are not attenuated by more than about 1 dB.

FURTHER EMBODIMENTS

In many of the above embodiments the cypher fields were the same and time-aligned.

Figure 38:
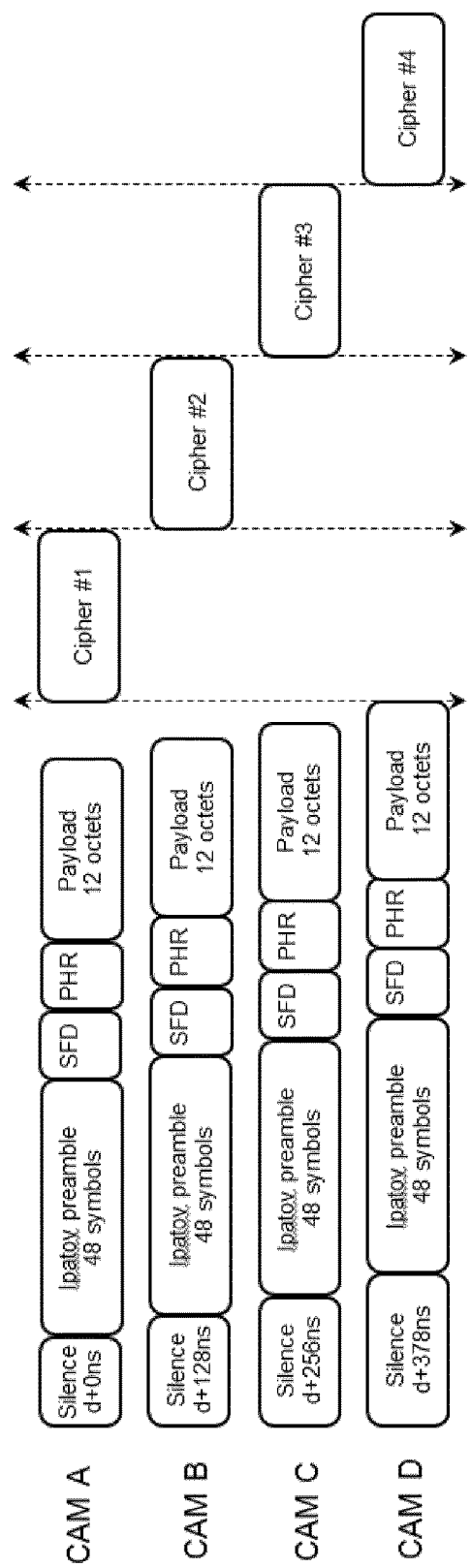

However, in other embodiments, each responding transceiver ("CAM") sends its own (different) cypher preamble with a different delay. An example is shown in FIG. 38. Here, the frame sent by each transceiver includes a respective different cypher field #1-#4 (corresponding to the "Decacypher" field shown in earlier embodiments).

This allows the receiver to acquire multiple distance measurements—e.g. one for each responding transceiver. To enable this, the size of the gap after each payload is not simply N*128 ns as before, but N*128 ns+M*(cypher_length+extra gaps separating cyphers). The extra gap separating cyphers could be zero (as depicted in the FIG. 38 example) or greater than zero to provide greater separation (in alternative examples the cyphers could be staggered and partially overlapping).

Figure 39:
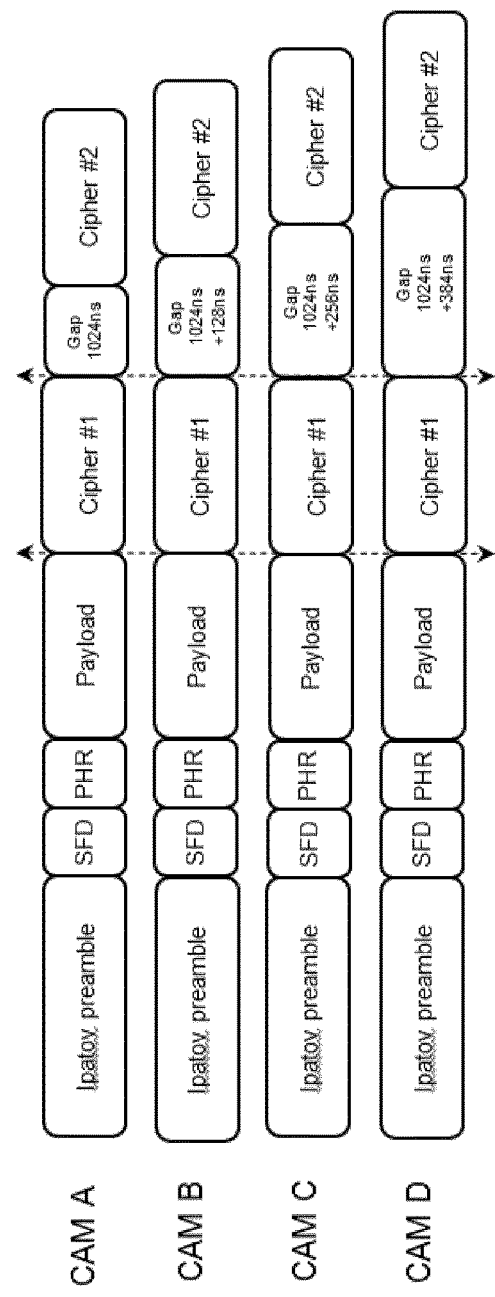

In a further variation, multiple cypher preambles may be included in each transceiver's frame. In a specific example, as depicted in FIG. 39, there are two cyphers (#1 and #2) in each frame. Cypher #1 is used for secure distance measurement to the nearest device (e.g. using the previously described techniques), and all cypher #1 segments are time-aligned. Cypher #2 is staggered and is intended to produce multiple peaks after correlation/accumulation. These peaks will reveal individual distances of responding transceivers. Based on these multiple distance measurements, multilateration and/or triangulation can be used to find the location (e.g. distance and direction) of the keyfob relative to the vehicle (or vice versa). Staggering of the second cypher field is achieved by a variable transmission gap between Cypher #1 and Cypher #2 (in this example 1024 ns+n×128 ns, for n ranging from 0 to 3).

Distances derived from cypher #2 may not be secure because cypher #2 may become known to an attacker after the first transmission from transceiver "CAM A". Cypher #1 may optionally be skipped; in that case only the distance measurement for transceiver "CAM A" would be secure; the rest (B,C,D) could potentially be attacked.

Figure 40:
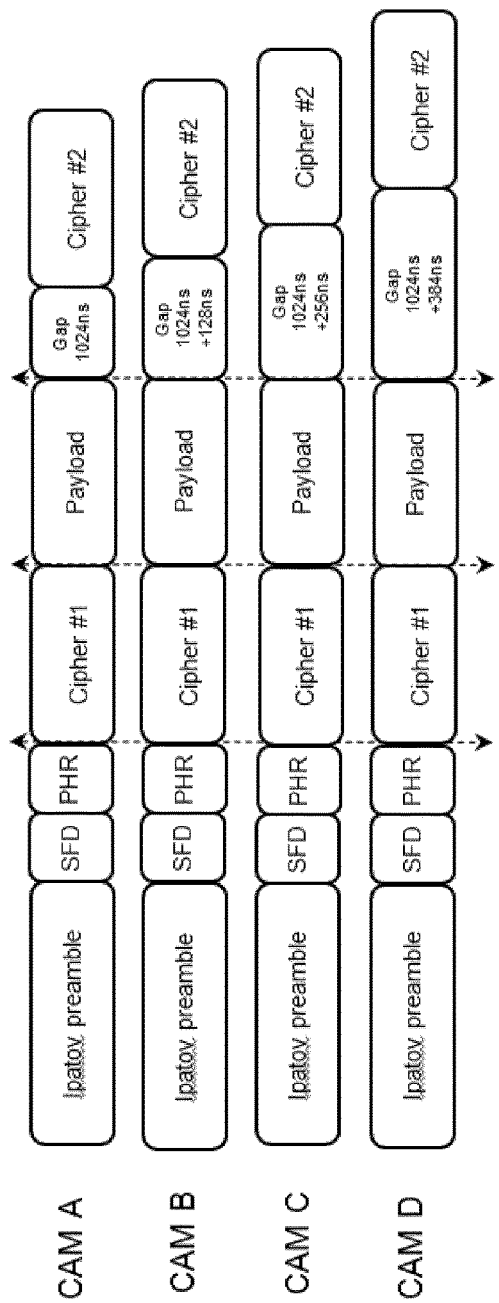
Figure 41:
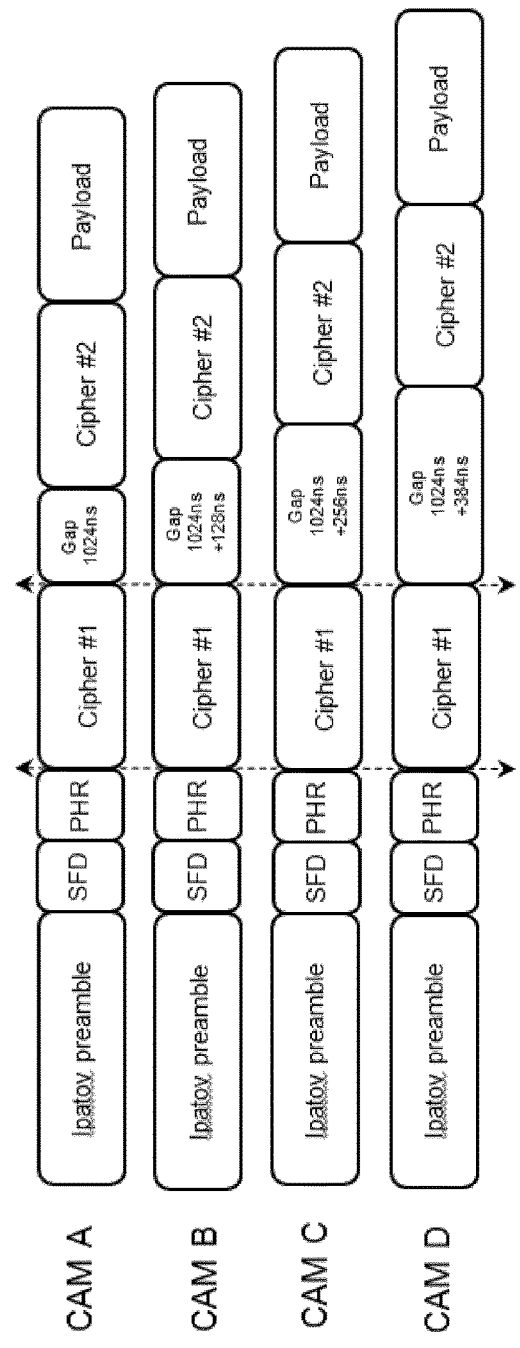

FIGS. 40 and 41 show alternative variations of the FIG. 39 embodiment using two cypher preambles per frame, but with different locations of the payload. In FIG. 39, the payload precedes both cypher fields, whereas in FIG. 40 the payload is placed between the cypher fields and in FIG. 41 the payload is appended after the second cypher field, at the end of the frame.

It will be understood that the present invention has been described above purely by way of example, and modification of detail can be made within the scope of the invention.

While described in some cases as different embodiments, any or all of the variations described throughout this disclosure (for example different described organizations of frames, cypher fields etc.) may be provided as different operating modes within a single device or system.

Various embodiments of the invention described above may provide some or all of the following features and advantages.

Embodiments may provide for the transmission of multiple packets in parallel rather than serially. This can reduce the time the receiver needs to stay active (power saving).

Various different schemes and combinations are possible. For example, multiple transmissions' start times (first Ipatov preamble symbol) can be offset by variable delays (in the examples above typically between 0 and 2000 ns but other delays can be used). What is common to many or all of the described schemes is that start of the cypher preamble is aligned across all transmissions.

Embodiments may enable calculating localization based on a single simul-packet (where the term "single simul-packet" refers to the multiple versions of a response frame transmitted in parallel). Due to variable offsets, there are multiple separated peaks in the Ipatov accumulator. This enables calculating the distances from each lock/anchor to keyfob. While multiple Ipatov-based distances may not be secure, the shortest Ipatov distance should generally match the DecaCypher-based distance. This can provide one secure distance measurement and three less secure distance measurements. Therefore localization based on such triangulation would still be reasonably secure. When the secure distance measurement (based on DecaCypher) matches the shortest of the Ipatov-based measurements, the packet can therefore be considered reliable/authentic; otherwise, the packet can be discarded and/or not utilised for distance determination.

Embodiments may implement trimming of clock crystals on responding anchor devices, so that the keyfob (the receiver of the final message) would be able to see all peaks in its accumulators. If CFOs between anchors differ by more than 1-2 ppm, then the keyfob will only see the peak of the anchor it has locked on to. There won't be any extra peaks from other anchors at all (or it will be strongly attenuated). To get all CFO's to be close to each other, all anchors listen to initial message from the keyfob, check the CFO calculated during reception and then trim their crystals to all respond at exactly the same frequency (for example 2 ppm from the keyfob's clock). Since the keyfob will know the targeted CFO (−2 ppm in this example), it can converge its carrier recovery algorithm faster (by pre-initializing carrier integrator to −2 ppm). That should allow for shortening of the Ipatov preambles.

Embodiments may implement compensation in the transmitting device, for the transmitter grid, by de-trimming the clock crystal for certain period like 200 µs, (thus speeding up time measurement or slowing it down), until it adjusts its timing offset to the required delay. This will allow the transmitter to effectively transmit at any time, rather than being limited to the 8 ns transmission grid.

Variations of the main scheme, mainly intended to shorten packet lengths in specific conditions can be provided. For example, on future chips it may be possible to configure any delay inside the message, in which case it will not be necessary to vary the number of Ipatov/data symbols. If localization is not needed and all data payloads can be identical then it is possible to implement the scheme with 0 ns offsets. Such packets are much shorter than default. This can also provide the advantage that all the anchors can transmit the packet so there is no risk that something causes no packet to be received because of a fault in the return channel from a favoured preselected transmitter.

If a data payload is not needed, it can be muted and transmitted at the end (or not transmitted at all), saving power. More generally, in some variants, certain portions of the frame, e.g. Ipatov, SFD and/or data payload, are muted on some anchors and only selected anchors transmit these parts of the frame. However all anchors transmit the cypher preamble (DecaCypher). This allows the total transmit power budget to be optimized. The anchors which transmit the Ipatov preamble can be pre-selected using various methods, e.g. based on a previous message from the keyfob or based on other transmission methods (Bluetooth etc.) Generally only anchors considered strongest may be selected to transmit the synchronization Ipatov preamble sequence.

The described processes or parts thereof may be implemented using one or more computer programs, stored in one or more computer-readable media, for execution by a suitable data processing device (e.g. a controller as depicted in FIG. 3A). In some embodiments, the methods may be implemented using a combination of hardware and software, but hardware-only embodiments are also possible.

The invention claimed is:
1. A method of transmitting signals from a first node having multiple transceivers to a second node, comprising:
receiving a message from the second node at the first node, wherein the message is received by each of a plurality of transceivers of the first node; and
transmitting by each of the plurality of transceivers a respective data frame to the second node in response to the message; wherein:
each transceiver initiates the transmission of its respective data frame a predetermined time period after receipt of the message by the transceiver;
the transmissions of the data frames from the plurality of transceivers overlap;
each of the data frames comprises a first training sequence and a second training sequence; and
for each respective data frame:
the first training sequence is located at a start of the respective data frame and is arranged to start a first time period after reception of the message by the respective transceiver, wherein the first time period differs from the first time period of each of the other data frames; and
the second training sequence comprises a cryptographically generated training sequence and is arranged to start a second time period after reception of the message by the respective transceiver, wherein the second time period is the same for each of the data frames.

2. A method according to claim 1, wherein:
the first training sequence comprises a plurality of symbols at a symbol rate; and
the start of each respective first training sequence is selected such that a start time of a given training sequence does not coincide with a symbol boundary of any of the other frames' first training sequences and/or such that symbol boundaries of the respective first training sequences are not aligned.

3. A method according to claim 1, comprising varying lengths of one or more portions of the data frames preceding the second training sequences so that the second training sequences start at a common time offset after reception of the message by a respective transceiver, the method comprising varying between different ones of the data frames the lengths of one or more of: the first training sequence, a data payload of the frame, or a transmission gap inserted prior to the second training sequence.

4. A method according to claim 1, wherein each respective second training sequence is preceded by a respective transmission gap sized so that the second training sequences of each of the data frames occur at the same time offset relative to reception of the message at a respective transceiver, the method comprising signaling the transmission gap size in a portion of the frame preceding the second training sequence, in at least one of: a physical layer header or a payload of the frame.

5. A method according to claim 4, comprising, for a given one of the data frames, including information specifying the respective transmission gap in unencrypted form in the physical layer header and again in encrypted form in the payload.

6. A method according to claim 1, comprising muting transmission of a portion of one or more but not all of the data frames, wherein:
muting transmission of a portion of a data frame comprises reducing transmission power or disabling transmission for the portion; and
the muted portion comprises one or more of: the first training sequence, a start-of-frame delimiter, a physical layer header, or a data payload.

7. A method of transmitting signals from a first node having multiple transceivers to a second node, comprising:
receiving a message from the second node at the first node, wherein the message is received by each of a plurality of transceivers of the first node;
transmitting by each of the plurality of transceivers a respective data frame to the second node in response to the message; wherein:
each transceiver initiates the transmission of its respective data frame a predetermined time period after receipt of the message by the transceiver;
the predetermined time period is the same for each of the transmitted data frames;
the transmissions of the data frames from the plurality of transceivers overlap;
each of the data frames comprises a first training sequence and a second training sequence, and
for each respective data frame:
the first training sequence is located at the start of the respective data frame; and
the second training sequence comprises a cryptographically generated training sequence; wherein the transmission timing of each transceiver is based on a respective clock of the transceiver; and
adjusting a clock frequency of one or more of the transceiver clocks to adjust a carrier frequency offset (CFO) of a respective transceiver, wherein the clock frequency is adjusted based on a detected CFO of an earlier transmission received from the second node.

8. A method according to claim 7, wherein:
the data frames are sent as part of a ranging exchange between the second node and the first node; and
the data frames are sent in response to an initial message of the ranging exchange sent from the second node to the first node.

9. A method of communication between a first node and a second node, comprising, at the second node:
sending a message to the first node;
receiving signals corresponding to a plurality of overlapping data frames transmitted by respective transceivers of the first node in response to the message;
identifying a particular one of the respective data frames and acquiring data of the identified data frame based on a first training sequence included in each respective data frame;
wherein:
the respective first training sequences start at respective different start times with respect to a reception time of the message at a respective transceiver; and
acquiring data of the identified frame comprises detecting a second training sequence contained in each of the data frames, the second training sequences of the data frames comprising cryptographically generated training sequences and starting at a common time offset from the reception time of the message at each of the respective transceivers; and
determining a reception time of the frame based on detection of the second training sequence and using the determined reception time to compute a distance between the first node and second node.

10. A method according to claim 9, wherein:
the received signal comprises multiple overlapping versions of the data frame corresponding to multiple signal paths from the transceivers to the second node; and
the method comprises detecting an earliest appearance of the second training sequence in the signal and using the earliest appearance to determine the reception time of the frame.

11. A method according to claim 9, comprising:
determining respective reception times of one or more of the first training sequences;
determining respective distances to respective ones of the transceivers based on the respective reception times;
determining a shortest one of the determined distances;
comparing the determined shortest distance to a distance computed based on reception of the second training sequence; and
processing the frame in dependence on the comparison.

12. A method according to claim 11, comprising at least one of:
determining that the frame is authentic if the shortest distance matches the distance determined based on reception of the second training sequence;
discarding the frame or a distance measurement determined therefrom if they do not match; or
determining a position of the first node based on a plurality of distance measurements derived from reception times of one or more of the first and second training sequences.

13. A method according to claim 9, wherein:
communication between the nodes is wireless based on a wireless communication protocol;

the first node comprises a vehicle and the second node comprises a remote control device for the vehicle; and the frames are exchanged as part of a control message exchange for controlling automated operation of the vehicle.

14. A device or system comprising:

a transceiver operable to transmit a message to a remote device and receive signals from respective transceivers at the remote device in response to the message, the signals corresponding to a plurality of overlapping data frames; and a processing device operable to identify a particular one of the respective data frames and acquire data of the particular one of the respective data frames based on a first training sequence including in each respective data frame, wherein the first training sequence is located at a start of the overlapping data frames and is arranged to start a first time period after reception of the message by the respective transceiver, wherein the first time period differs from the first time period of each of the other data frames; and each respective data frame further comprising a second training sequence including a cryptographically generated training sequence used to decipher the first training sequence.

15. A non-transitory computer-readable medium comprising data processing executable instructions that, when executed by a data processing device, cause operations to be performed, the operations comprising:

receiving a message from the second node at the first node, wherein the message is received by each of a plurality of transceivers of the first node; and transmitting by each of the plurality of transceivers a respective data frame to the second node in response to the message; wherein:

each transceiver initiates the transmission of its respective data frame a predetermined time period after receipt of the message by the transceiver;

the transmissions of the data frames from the plurality of transceivers overlap;

each of the data frames comprises a first training sequence and a second training sequence; and for each respective data frame:

the first training sequence is located at the start of the respective data frame and is arranged to start a first time period after reception of the message by the respective transceiver, wherein the first time period differs from the first time period of each of the other data frames; and the second training sequence comprises a cryptographically generated training sequence and is arranged to start a second time period after reception of the message by the respective transceiver, wherein the second time period is the same for each of the data frames.

* * * * *